(12) United States Patent  (10) Patent No.: US 9,014,238 B2
Jantunen et al.  (45) Date of Patent: Apr. 21, 2015

(54) METHOD OF AND APPARATUS FOR SYNCHRONIZATION

(75) Inventors: Joni Jantunen, Helsinki (FI); Jarmo Arponen, Espoo (FI); Iiro Jantunen, Kuopio (FI); Michaël Pelissier, Grenoble (FR); Bertrand Gomez, Meylan (FR); Jaakko Varteva, Veikkola (FI)

(73) Assignees: Nokia Corporation, Espoo (FI); Commissariat a l'Energie Atomique et aux Energies Alternatives, Paris (FR)

( * ) Notice: Subject to any disclaimer, the term of this patent is extended or adjusted under 35 U.S.C. 154(b) by 1019 days.

(21) Appl. No.: 12/739,846

(22) PCT Filed: Oct. 22, 2008

(86) PCT No.: PCT/EP2008/064268
§ 371 (c)(1),
(2), (4) Date: Jul. 28, 2011

(87) PCT Pub. No.: WO2009/053381
PCT Pub. Date: Apr. 30, 2009

(65) Prior Publication Data
US 2011/0274141 A1 Nov. 10, 2011

(30) Foreign Application Priority Data
Oct. 25, 2007 (EP) ..................................... 07119336

(51) Int. Cl.
*H04B 1/38* (2006.01)
*H04B 1/7183* (2011.01)
(Continued)

(52) U.S. Cl.
CPC ............ *H04B 1/7183* (2013.01); *H04L 1/0045* (2013.01); *H04L 1/0041* (2013.01); *H04B 7/2125* (2013.01)

(58) Field of Classification Search
CPC .. H04B 1/7183; H04B 7/2125; H04B 1/0041; H04B 1/0045
USPC .......................... 375/138, 219, 211, 228, 259
See application file for complete search history.

(56) References Cited

U.S. PATENT DOCUMENTS 5,852,630 A * 12/1998 Langberg et al. ............. 375/219
6,570,487 B1 * 5/2003 Steeves .......................... 340/5.2
7,890,135 B2 * 2/2011 Eckhart ..................... 455/552.1
(Continued)

FOREIGN PATENT DOCUMENTS

EP 1553426 8/2004
EP 1503513 2/2005
(Continued)

*Primary Examiner* — Dhaval Patel
(74) *Attorney, Agent, or Firm* — Stroock & Stroock & Lavan LLP

(57) ABSTRACT

A method and apparatus of synchronizing pulsed wireless communication between a first transceiver and a second transceiver. It includes the steps of transmitting a pulse signal from a first transceiver to a second transceiver; transmitting a reflection signal from the second transceiver to the first transceiver if the transmitted pulse signal is received at the second transceiver within an active reception period of the second transceiver; and detecting the reflection pulse to determine synchronization between the first transceiver and the second transceiver. Embodiments of the invention also relate to an apparatus for carrying out the method. In one embodiment, the reflection signal is generated by a super-regenerative oscillator.

27 Claims, 32 Drawing Sheets

(51) Int. Cl.
*H04L 1/00* (2006.01)
*H04B 7/212* (2006.01)

(56) References Cited

U.S. PATENT DOCUMENTS

| | | | |
|---|---|---|---|
| 8,155,055 B2 * | 4/2012 | Haartsen et al. | 370/328 |
| 8,374,230 B2 * | 2/2013 | Yoshihara | 375/228 |
| 2006/0093077 A1 | 5/2006 | El Fawal et al. | |
| 2007/0147476 A1 | 6/2007 | Merz et al. | |
| 2007/0217482 A1 | 9/2007 | Pelissier et al. | |

FOREIGN PATENT DOCUMENTS

| | | | | |
|---|---|---|---|---|
| EP | 1655853 | | 5/2006 | |
| EP | 1830474 | | 2/2007 | |
| WO | 96/34462 | | 4/1996 | |
| WO | WO2007/055350 | * | 5/2007 | H04L 25/49 |

* cited by examiner

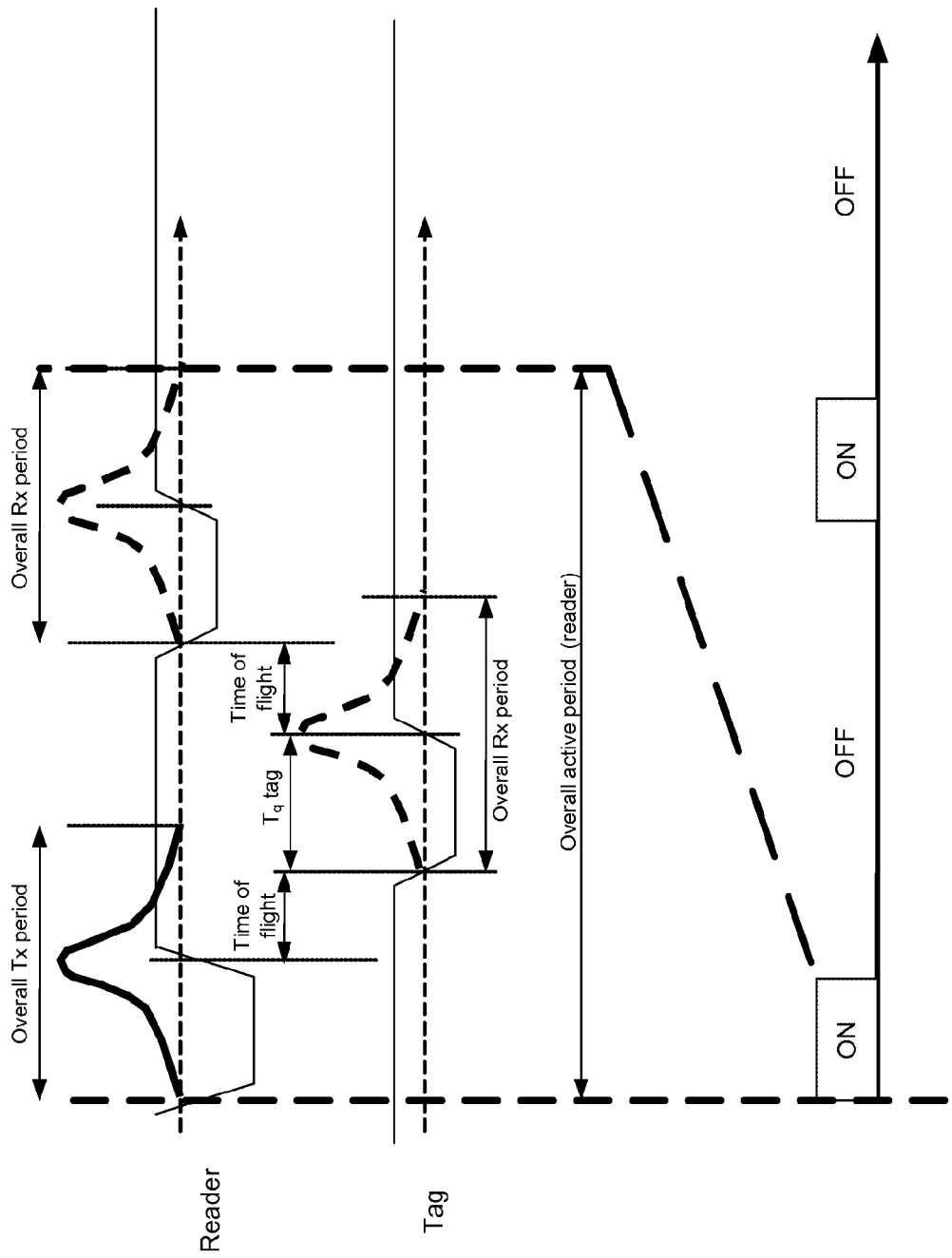

METHOD OF AND APPARATUS FOR SYNCHRONIZATION

CROSS REFERENCE TO RELATED APPLICATION

This application is the U.S. National Phase application under 35 U.S.C. §371 of International Application No. PCT/EP2008/064268, filed Oct. 22, 2008, and claims the benefit of European Patent Application No. 07119336.1, filed Oct. 25, 2007, all of which are incorporated by reference herein. The International Application was published on Apr. 30, 2009 as WO 2009/0453381.

FIELD OF THE INVENTION

The present invention relates to a method and an apparatus for synchronising a transceiver to an incoming signal. Particularly but not exclusively the invention relates to a method and an apparatus for synchronisation for pulsed wireless communication such as pulsed Ultra Wide Band (UWB) radio frequency (RF) communication between a first transceiver and a second transceiver.

BACKGROUND OF THE INVENTION

As the field of radio frequency identification (RFID) progressively advances there is an increasing need for RFID systems having a high data rate of the scale of 10 Mbit/s or above. The need for a high bit-rate RFID system is based on the fact that the power consumption and price of non-volatile memories are continually on the decrease. Increasingly more novel memory technologies are being developed which offer new perspectives in terms of the reduction of price and power consumption. The development in memory technology enables the use of mass memories of a size in the scale of mega-to-gigabytes in passive RFID tags remotely powered by a reader or another device. Current RFID air-interfaces, however, typically support data rates of up to the order of hundreds of kilobits per second and are mainly based on back-scattering and modulation of continuous wave signals. Such methods, however have some technical limitations from a performance perspective and these limitations are especially emphasised when RFID reader functions are integrated into devices with small physical dimensions.

Impulse radio based UWB provides an interesting solution for high data rate communication applications due to the available wide bandwidth. Rather than modulating a continuous carrier frequency, pulsed UWB communication is based on the transmission of short pulse signals. As illustrated in FIG. 1, the modulation can be based on the presence or absence of a pulse signal (OOK modulation), the pulse signal position (PPM) or the pulse polarity (B-PSK). Due to the short pulse signal duration, the width of the frequency spectrum is broad. In accordance with the Shannon theory, this makes it possible to achieve a higher data rate than can be achieved in traditional narrow band solutions.

Since UWB provides a wide available bandwidth, very short pulses may be transmitted such that the duration of one pulse is much lower than the symbol duration of the data. This results in a low duty-cycle of the system. As an example, if the target data rate is 10 Mbit/s the maximum symbol interval is 100 ns/symbol. The duration of UWB pulses can, however, be much lower such as 1-10 ns. Even with a pulse duration of 10 ns the duty cycle is only 10%. With shorter pulses the duty cycle is of course even lower. The low duty-cycle on air-interface can be directly utilized advantageously in the power consumption of transceiver. Depending on the duty cycle it may be necessary to keep the transceiver active only, for example, 10% of the time. To make this possible it is necessary to have good frequency and phase synchronisation between transmitting and receiving devices. In practice it is usually more straightforward to adapt the timing of the receiver to transmission than vice versa and thus the major part of the work is typically carried out at the receiving end to synchronise reception by the receiver of a transmitted pulse signals. The device initiating the communication, for example an RFID reader, typically transmits a continuous RF wave to power up the other end, for example an RFID tag, and can also serve as a common clock reference for both ends in order to ensure that both ends operate at the same frequency. Before data communication through impulse UWB is possible, phase synchronisation between the co-operating devices should be achieved.

Frequency and phase synchronisation in UWB communication present many challenges. In particular, since the transmission is pulsed rather than continuous, in cases where the transceivers of communication devices are not continuously active, i.e. the receiver detection is discontinuous, the timing of active reception periods of the receiving device should be synchronised in some way with the incoming transmitted signal from the transmitting device. Otherwise, the receiving device has a high probability of missing the incoming signal transmitted by the transmitting device. There is thus a need to synchronise the active reception periods of a receiving device with the transmission of signals from a transmitter.

The feasibility of remote powering of mass memory tags and maximum communication range requires that RFID tag power is extremely optimized and kept as low as possible. As a consequence power hungry high frequency synthesis like PLL (phase-locked loop) or DLL (Delay Locked Loop) and digital tracking systems should not be implemented in tags for sufficient frequency and phase synchronisation since otherwise the power consumption could easily grow to a level unfeasible for remote powering.

A factor that further hinders synchronisation of UWB impulse radios is the regulations set for UWB transmission spectrum. In UWB systems long spreading sequences (time-hopping codes) are required to remove spectral lines resulting from pulse repetition present in the transmitted signal. FIG. 2 illustrates, as an example, the principle of time-hopping in the time domain using On-Off-Keying modulation, which is commonly used in UWB impulse radios. The code sequences could also be efficiently used for multiple user access.

Since the benefits of time-hopping are obvious from the perspective of the transmission spectrum, it is of interest to use it in UWB impulse radio communication. However, its use results in a more time-consuming synchronisation procedure since the phase of time-hopping scheme must be known by both the transmitter and the receiver of the system before a reliable communication link can be set up. In constant pulse repetition, in practice, the maximum number of needed iteration rounds would directly be the number of possible pulse positions within one symbol which is four in the example of FIG. 2. However, when time-hopping scheme is used, the maximum required number of iteration rounds increases to the number of symbols used for time-hopping scheme multiplied by the number of time-hopping positions per symbol. As can be easily understood, the use of time-hopping makes the phase synchronisation procedure time-consuming but is essential to achieve a smooth transmission spectrum.

In short, some of the main factors that render phase synchronisation in low-power UWB impulse radio systems challenging are:

the low duty-cycle needed to keep average power consumption at a reasonable level; and time-hopping of UWB pulses which is needed to keep the transmission spectrum smooth.

Prior art methods for finding phase synchronisation between two or more UWB devices involve searching for correlation between the incoming pulse sequence and a known reference code sequence by sliding and fine-tuning the timing of reference sequence. As soon as the phase between the received signal and the reference code is correct, a correlation peak emerges. This method is called serial search. A parallel search is an alternative method to speed up the synchronisation process. Nevertheless, parallel search requires complex circuit receiver because each branch is duplicated.

An example diagram of such a method is illustrated in FIG. 3. In this example the reader transmits time-hopping synchronisation sequences periodically. The counterpart device, a tag in this case, listens to the synchronisation sequences and correlates the input data with the reference sequence. After each correlation round it may pause so that the incoming sequence will finally match with the reference sequence. As soon as the correlation is high enough, the tag may prepare itself for sending information to the reader during the predefined time slot. However, since the time-hopping sequences must be relatively long to achieve a smooth transmission spectrum, finding the correct phase between the sequences is time consuming especially when the duty-cycle of receivers at both ends of the system are low due to optimization of power consumption, as described above.

Another weakness of the prior art serial search synchronisation method is that the complexity is at the receiver side and not in the emitter. For this reason, the use of the prior art method necessitates that, in case of passive memory tags, the tag should be capable of doing correlation between incoming code sequence and the known reference sequence. The other alternative is of course that the tag would be the emitter of the synchronisation sequence which decreases the complexity in the tag. When entering the field of communication the tag would send the synchronisation pulse on a regulator time base, and the reader would have to synchronise itself on the tag synchronisation pulse. This behaviour is the well known "tag talk first" principle. However, a drawback of such an arrangement is collision management since each tag in or entering the field contributes to channel saturation.

Some improvements to the traditional serial search method with spread-spectrum sequences are proposed in US2006/0093077 in an attempt to address some of the aforementioned problems. This document describes a method of synchronisation based on a cross correlation between an input signal and a template pulse train. However, the system does not address all of the above problems.

An embodiment of the serial search synchronisation approach is based on super-regenerative architecture. This architecture was widely used in wartime, in pulse responders for radar identification. In such a system, an interrogator sends an interrogating pulse to a transponder to be identified. The fundamental theory of super-regeneration was established during this period. More recently, the application of the super-regenerative receiver has extended to narrow-band systems in which reduced cost and low power consumption are required. The technology has very recently been extended to Ultra Wideband pulse communication which implies a novel approach with regard to super-regenerative architecture optimization. In this technology, precise timing is required for synchronization of the bi-directional communication between transceivers. There is thus a requirement for a power efficiency method to cope with synchronization issues in UWB communication based on super-regenerative receiver.

A problem that may be encountered using super-regenerative technology is the generation of signals by a super-regenerator in a transceiver even when there is no incoming transmission pulse from a co-operating transceiver, for example in response to an incoming signal from another transceiver or originating from noise or other interference. Difficulties arise in distinguishing an intended incoming pulse from a co-operating transceiver and an incoming signal resulting from other effects.

The European patent application EP 1 503 513 A1 discloses a method for identifying the beginning of an Ultra Wideband pulse sequence.

SUMMARY OF THE INVENTION

The present invention sets out to provide a method of and an apparatus for synchronisation in pulsed wireless communication, in particular in UWB communication, with a general objective to overcome or at least ameliorate the aforementioned problems.

In general terms, the invention provides a method of synchronising an active reception and detection time-slot of a second transceiver with a transmission pulse of a first transceiver by detecting at the first transceiver a reflection pulse transmitted by the second transceiver in response to the transmission pulse. The reflected pulse information is used to find the optimum phase synchronization of the two devices. It will be understood that in the context of the present invention, the term reflection signal refers to a signal transmitted by a second transceiver in response to an incoming transmission signal from the first transceiver and received at the second transceiver. It will be understood that the reflection signal may or may not be timely spaced from the received incoming signal.

In a first aspect of the invention there is provided a method (in particular, a method of synchronisation for pulsed wireless communication between a first transceiver and a second transceiver) the method comprising: transmitting a transmission pulse signal from a first transceiver to a second transceiver; transmitting a reflection signal from the second transceiver to the first transceiver in response to the transmission pulse signal if the transmission pulse is received at the second transceiver within an active reception timeslot of the second transceiver; and detecting the reflection signal to determine synchronisation of the first transceiver with the second transceiver.

A second aspect of the invention provides a method (in particular, a method of synchronising a transceiver to a co-operative transceiver) the method comprising: receiving a transmission pulse signal from a co-operative transceiver; generating a reflection signal in response to the transmission pulse signal and transmitting the reflection signal to the said co-operative transceiver if the transmission pulse signal is received within an active reception timeslot of the transceiver, such that synchronisation with the received transmission pulse signal can be determined.

A third aspect of the invention provides a method (in particular, a method of synchronising a transceiver to a co-operative transceiver), the method comprising: transmitting a transmission pulse signal; receiving a reflection signal transmitted by the said co-operative transceiver in response to the transmitted pulse signal if the transmitted pulse signal was received within an active reception timeslot of the co-operative transceiver; and detecting the reflection signal to determine synchronisation with the co-operative transceiver.

The method, according to any one of these aspects, is especially useful in low-power systems in which power consumption of transceivers is optimized by using a low duty-cycle and the transmission of signal is pulsed with or without pseudo-randomized time-hopping sequences such as is the case for impulse radios operating according to UWB regulations. Such a method allows power consumption to be kept to a minimum thereby providing a power efficient synchronisation method.

Moreover, in comparison with the prior art methods the method according to any one of the aspects of the invention provides an immediate acknowledgement to confirm the synchronization in UWB impulse radio communication. Based on the acknowledgement information, the synchronization process can be accelerated in comparison with the methods traditionally used in UWB communication since in some embodiments of the invention the length of a synchronisation sequence can be a single transmission pulse.

Furthermore, a reflection signal can indicate that the transmitted pulse initializing the reflection was detected by the receiving end, which enables the synchronization algorithm to be implemented in the transmitting end instead of the receiving end. Thus, in the case of an RFID reader, for example, where the first transceiver can be a reader and the second transceiver can be a corresponding tag, a synchronization algorithm does not have to be performed in the tag thereby enabling the tag to have a lower power consumption and a more simplified circuit architecture.

Exploiting the synchronisation procedure according to embodiments of the invention in a high data-rate RFID system can have many benefits. The synchronisation algorithm is simpler from the perspective of the tag thereby enabling power consumption to be reduced in the tag. In mass memory RFID implementation, for example, the complexity of the algorithm is mainly in the reader which typically has system-wise less stringent power consumption requirements than the tag. Further, the synchronisation method supports bi-directional communication between two transceivers and thus an RFID system, for example, can be implemented by using similar RF transceiver structures in the reader and tag. Such a synchronisation method is also compatible with multiple-access.

The reflection signal may be generated by an oscillator at the second or the co-operative transceiver. According to an embodiment of the invention, the reflection signal is generated by a super-regenerative oscillator.

In this way, contrary to prior art methods, super-regenerative oscillations can be advantageously exploited to provide a detectable reflection signal. The associated benefits being that the signal is amplified without the requirement of a separate amplifier in the circuit architecture, power consumption is reduced and the overall circuit architecture is simplified.

On short communication distances, for example, it will not be necessary to use any extra LNA and/or PA to amplify received or transmitted pulses, thereby rendering it possible to have a simple circuit structure between the antenna and the super-regenerative oscillator in the transceiver contrary to prior art methods in which a low noise amplifier (LNA) stage is used to eliminate any reflected signal which is critical in narrow band applications.

An embodiment of the invention thus provides a power efficiency method to cope with the synchronization issue in UWB communication based on a super-regenerative receiver.

The super-regenerative oscillator may receive a quench signal to enable the build up of self oscillations of the super-regenerative oscillator. The active reception period of the second transceiver can thus be controlled by the quench signal waveform. For example, parameters such as the pulse width, period, amplitude, slope etc may be used to control the pulse detection process. This allows the reception period of the second or the co-operative transceiver to be adjusted according to the requirements of the system.

For example, the active reception period of the second or the co-operative transceiver can be defined by the correspondence of the peak envelop of the transmission pulse signal and the time when the damping factor of the super-regenerative oscillator becomes negative. This enables optimal synchronisation between the quench signal and the incoming transmission pulse.

The quench signal duration can be varied to adjust the time delay between the transmission pulse signal and the reflection signal. This enables detection of the reflection signal at the reader to be optimised.

At least one of the amplitude and the period of the quench signal can be adjusted to vary the amplitude of the reflection signal. This provides a flexible system which can be adjusted to the needs of the particular application.

The reflection signal may, alternatively to the super-regenerative solution, be generated by a pulse generation module.

In some embodiments of the invention the second or the co-operative transceiver may transmit the reflection signal onto the same signal path as that followed by the pulse transmitted by the transmitter, the signal path being bi-directional.

If required, the reflection signal can be amplified.

The amplitude of the reflection signal may be detected. The first transceiver may use this measurement to detect synchronisation between the first transceiver and the second transceiver.

To detect the reflection signal a detection signal may be generated by an oscillator at the first transceiver in response to the reflection pulse signal. The detection signal may be generated by a super-regenerative oscillator at the first transceiver in response to the reflection signal.

The peak value of the detection signal can be measured so that the timing of the transmission signal of the first transceiver can be adjusted to tune the synchronisation and find the best alignment with the quench signal of the second transceiver.

The detection signal may be transmitted from the first transceiver to the second transceiver. This may be used to provide the second transceiver with an acknowledgement when, for example, data is transferred from the tag to the reader.

The first transceiver may transmit a test pulse signal out of sequence with the transmission pulse wherein detection of a test reflection signal in response to the test pulse signal indicates interference between the first transceiver and the second transceiver. Such a step allows a measurement of the propagation environment and the presence of reflective structures which may provide interfering reflection pulses to be made.

The method may further comprise transmitting a sequence of transmission pulse signals from the first transceiver to the second transceiver according to a pre-determined sequence; transmitting a reflection pulse signal from the second transceiver to the first transceiver in response to at least one of the transmission pulse signals if a transmission pulse signal is received in an active receptive period of the second transceiver; and detecting at least one reflection signal to determine continued synchronisation between the first transceiver and the second transceiver. This step allows verification of the synchronisation between the first transceiver and the second transceiver to be made. If, for example, the first detected reflection signal is due to interference instead of from the second transceiver, reflection pulses for the rest of the sequence are likely not to occur and the process of synchronisation can be restarted. With this step it can also be checked if the correlation is good enough or if synchronisation between the transceivers has been lost.

The second transceiver may be inactivated once synchronisation between the first transceiver and the second transceiver has been established. This allows the first transceiver to establish synchronisation with other transceivers without interference from the second transceiver.

Data may be included in the transmission pulse or the reflection pulse.

The time of flight of the transmission pulse and/or the reflection signal between the transceivers may be measured to estimate the distance between the second transceiver and the first transceiver.

According to a fourth aspect of the invention there is provided a method of data communication between a first transceiver and a second transceiver comprising: synchronising the phase between the first transceiver and the second transceiver according to the method described above; and transmitting data between the first transceiver and the second transceiver. The method may further comprise synchronising the frequency of the first and second transceiver.

According to a fifth aspect of the invention there is provided a synchronisation system for synchronising pulsed wireless communication between a first transceiver and a second transceiver, the device comprising: a first transceiver operable to transmit a pulse signal from the first transceiver to a second transceiver; a second transceiver operable to receive the pulse signal, to generate a reflection signal in response to the pulse signal and to transmit the reflection signal to the first transceiver if the transmitted pulse is received at the second transceiver within an active reception period of the second transceiver; wherein the first transceiver is operable to detect the reflection signal to determine phase synchronisation between the first transceiver and the second transceiver.

The second transceiver may comprise an oscillator operable to generate the reflection signal in response to the pulse signal received from the first transceiver. The oscillator may be a super-regenerative oscillator. Further, the super-regenerative oscillator may be operable to receive a quench signal to activate the super-regenerative oscillator.

The super-regenerative oscillator may be directly coupled to the antenna of the second transceiver. Thus, reflection of the oscillation pulse generated can be exploited to transmit the reflection signal from the second transceiver to the first transceiver.

The first transceiver may comprise an oscillator to generate a detection signal in response to the reflection signal.

The first transceiver may include measurement means for measuring the peak value of the detection signal. The second transceiver may include an amplitude detector for determining that the amplitude of the reflection pulse signal has exceeded a pre-determined threshold.

The first transceiver may be operable to transmit a test signal out of sequence with the transmission pulse signal.

The system may further comprise distance measurement means for measuring the time of flight of the transmission pulse and/or the reflection signal between the first transceiver and the second transceiver to determine the distance between the first transceiver and the second transceiver.

The second transceiver may alternatively comprise a pulse generation module for generating the reflection pulse signal. The system may further comprise a pulse demodulator for detecting the transmission pulse signal.

The first transceiver may be an RFID reader and the second transceiver may be an RFID tag or vice versa.

According to a sixth aspect of the invention there is provided an apparatus (in particular, a transceiver for pulsed wireless communication) the apparatus comprising: a receiver for receiving a pulse signal; a signal generator for generating a reflection signal in response to the pulse signal if the received pulse signal is received with an active reception timeslot of the transceiver; a transmitter for transmitting the reflection signal to a co-operative transceiver such that synchronisation with the received pulse signal can be determined.

The signal generator may be directly coupled to an antenna of the apparatus such that the reflection signal can be radiated from the antenna. The signal generator may be a super-regenerative oscillator.

According to a seventh aspect of the invention there is provided an apparatus (in particular, a transceiver for pulsed wireless communication), comprising: a transmitter operable to transmit a pulse signal to a co-operative transceiver; a receiver operable to receive a reflection signal transmitted by the co-operative transceiver in response to the pulse signal if the transmitted pulse signal was received within an active reception timeslot of the co-operative transceiver; and a detector operable to detect the reflection signal to determine synchronisation with the co-operative transceiver.

An eighth aspect of the invention provides a computer program product comprising program code stored on a machine readable medium for carrying out the method described above, when the program product is run on a processor based device, a terminal device, a network device, a portable terminal, a consumer electronic device or a wireless communication enable terminal.

A ninth aspect of the invention provides a chipset configured to execute the above described method. The chipset may comprise one or more chips.

A tenth aspect of the invention provides an apparatus, comprising: receiving means for receiving a pulse signal; signal generating means for generating a reflection signal in response to the received pulse signal if the received pulse signal is received within an active reception timeslot of the receiving means; and transmitting means for transmitting the reflection signal to a co-operative transceiver such that synchronisation with the received pulse signal can be determined.

An eleventh aspect of the invention provides an apparatus, comprising: transmitting means for transmitting a pulse signal; receiving means for receiving a reflection signal transmitted by a co-operative transceiver in response to the pulse signal if the transmitted pulse signal was received within an active reception timeslot of the co-operative transceiver; and detecting means for detecting the reflection signal to determine synchronisation with the co-operative transceiver.

According to an embodiment of the invention the first transceiver may transmit two transmission pulse signals consecutively wherein detection of the two consecutive transmission pulse signals by the second transceiver determines synchronisation of the first transceiver with the second transceiver.

Such a method helps to eliminate false alarms which may result from an RFID tag receiving noise or interference (referred to as a zero signal) at the input to the antenna instead of a transmitted signal from a corresponding reader. The reception of noise signals may lead to the generation and transmission of a reflection signal from the tag known as a ghost signal. The first transceiver may in turn generate a ghost signal in response to reception of the ghost signal from the second transceiver. By transmitting and detecting two consecutive transmission signals it is easier to differentiate such transmission signals from noise or interference.

The second transceiver may detect for a first signal during a first detection period, and detect for a second signal during a second consecutive detection period if the amplitude of the first signal detected in the first detection period exceeds a first predetermined threshold, wherein synchronisation of the first transceiver with the second transceiver is determined if the amplitude of the second signal exceeds a second pre-determined threshold. The first and second predetermined threshold may be at the same level.

The timing of active reception time slot of the second transceiver may be adjusted according to the pulse separation of the first transmission pulse signals. Known detection of a ghost pulse may be used as input for the adjustment. Consequently the probability of a subsequent match being an intentional transmission pulse coming from the reader and not a ghost pulse can be increased.

According to a further embodiment, the first transceiver transmits a sequence of pulses according to a set bit pattern. The use of a multi-bit pattern makes the detection of phase synchronisation more reliable, and helps the reduce the occurrence of false alarms. Further the signal pattern reflected from the tag may be used to gain additional information about the RF link between the reader and the tag. Preferably, the set bit pattern includes at least one zero in order to avoid problems relating to unwanted reflection, so called ghost pulses from the reader.

In some embodiments the second transceiver may transmit a further transmission pulse to the first transceiver after having received a transmission pulse from the reader and generated a reflection signal in response to the transmission pulse. The first transceiver may then transmit a further reflection signal to the second transceiver in response to reception of the further transmission pulse; and the second transceiver may detect the further reflection signal. Such a method helps to improve the reliability of phase synchronisation. The further transmission pulse may be transmitted after a delay Tval after the reflection signal.

BRIEF DESCRIPTION OF THE DRAWINGS

Embodiments of the invention will now be described, by way of example only, and with reference to the following drawings in which:

FIG. 21B is an enlarged illustration of FIG. 21A displaying the timing of transmission and reflection signals in the tag and the reader;

DETAILED DESCRIPTION OF THE EMBODIMENTS

Although for the sake of illustration, embodiments of the present invention will be described with reference to an RFID communication system comprising a reader and a tag, it will be appreciated that the present invention may be applied to other wireless communication systems in which a first transceiver co-operates with a second transceiver.

Figure 1:
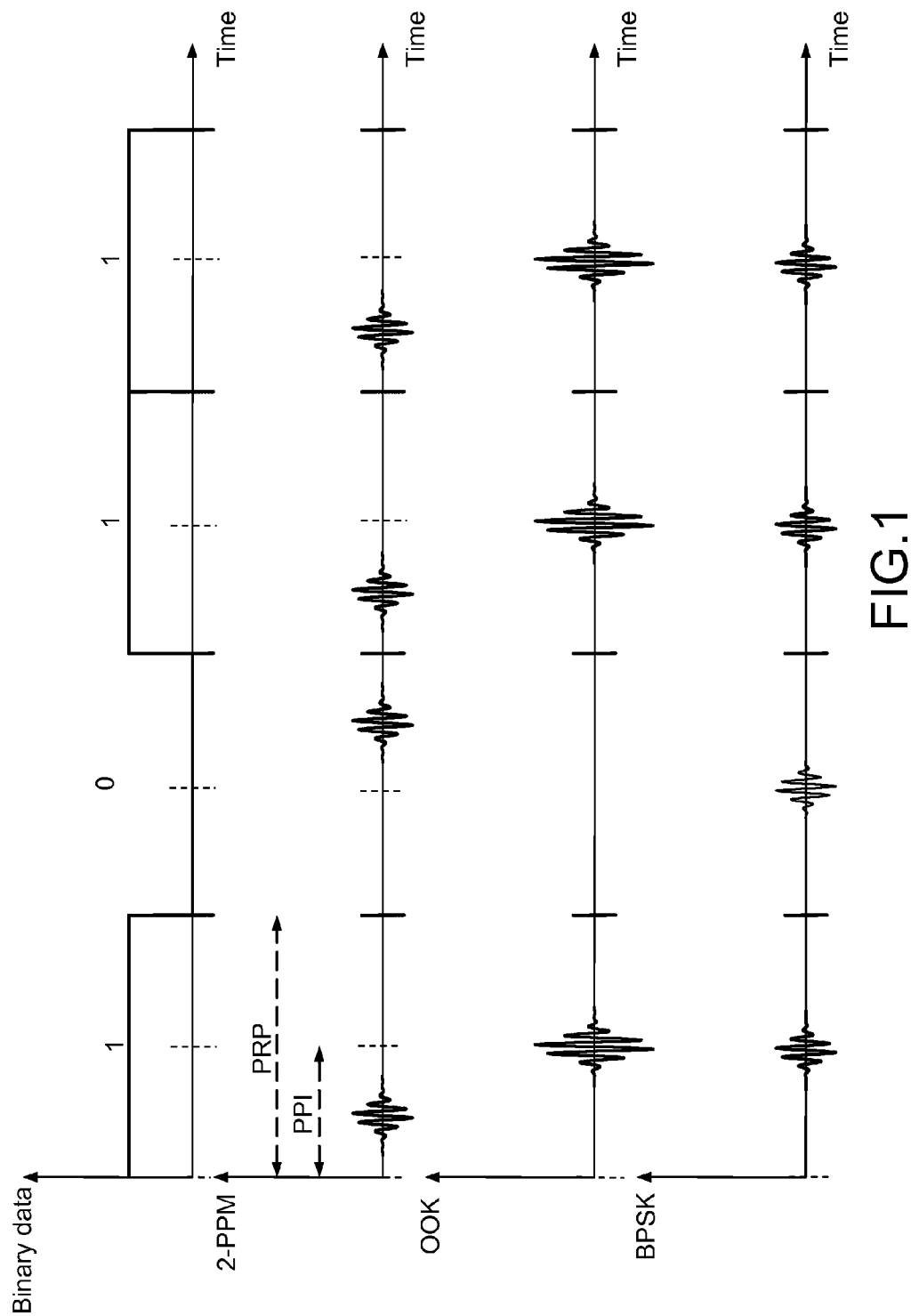
FIG. 1 is a graphical representation of various forms of modulation used in UWB communication.
Figure 2:
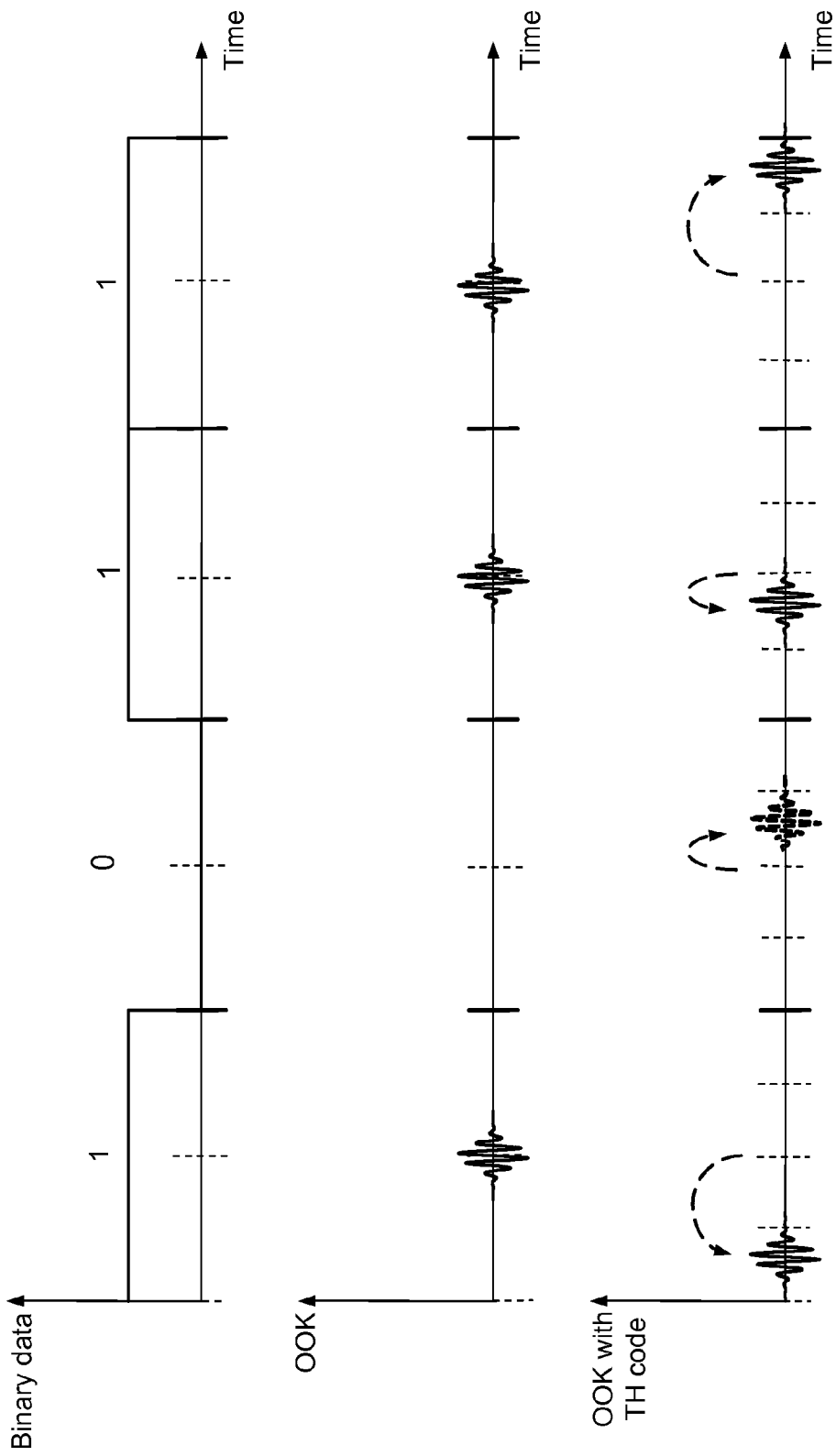
FIG. 2 is a graphical representation of a principle of time hopping used in UWB communication.
Figure 3:
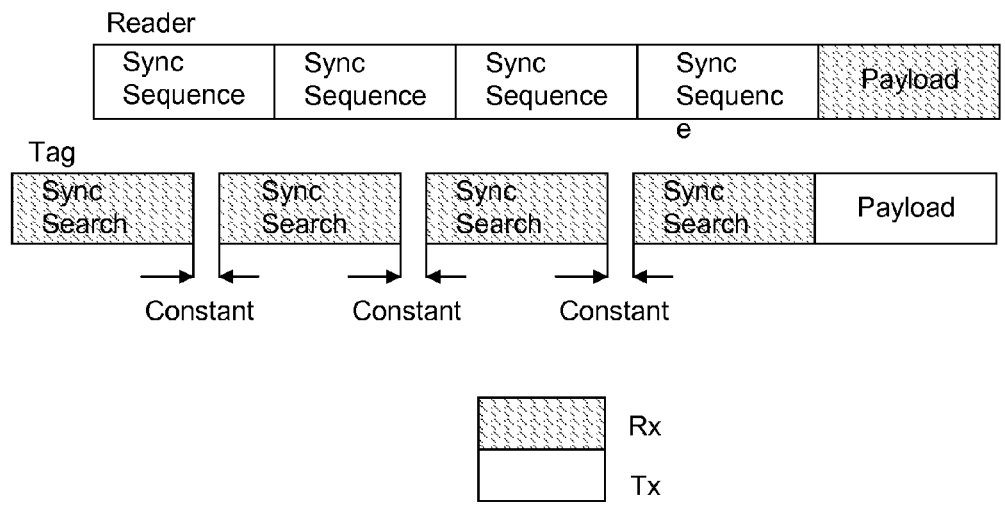
FIG. 3 is a schematic diagram of a prior art method of phase synchronisation between two transceivers.
Figure 4:
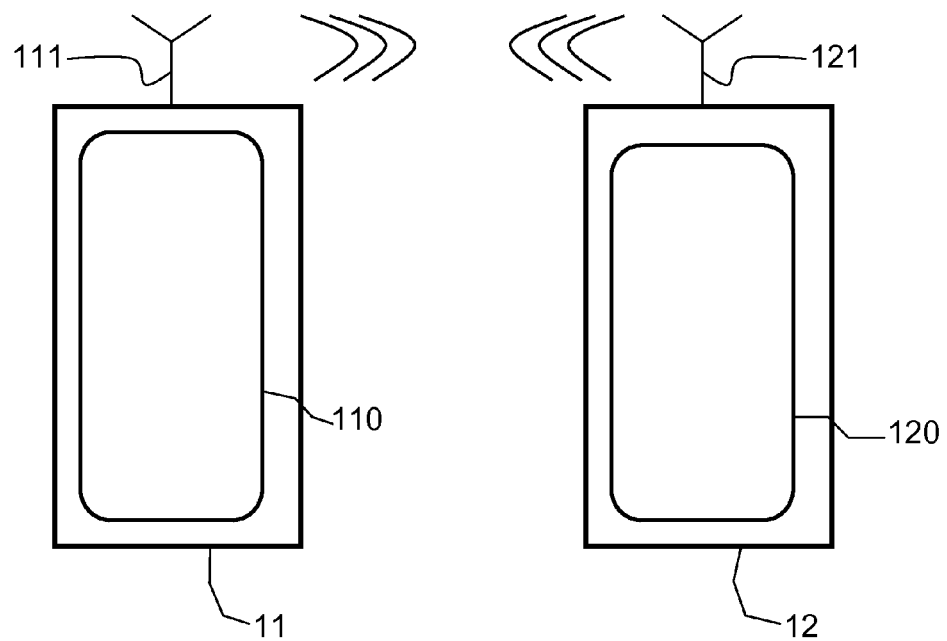
FIG. 4 is a schematic diagram of an RFID reader and tag according to at least one embodiment of the invention.

FIG. 4 is a block diagram of a RFID system according to a first embodiment of the invention comprising a RFID reader interface for an RFID transponder, denoted for the sake of simplicity as an RFID reader, 11, and a RFID transponder, also known as a RFID tag, 12. The RFID reader 11 comprises reader circuitry 110 and an antenna 111 for transmitting and receiving radio frequency (RF) signals. RFID tag 12 is a passive RFID tag which can be energised by reader 11 and comprises tag circuitry 120 and an antenna 121. The tag may be remotely powered, for example, by the reader using continuous wave RF transmission in the Ultra High Frequency (UHF), Industrial, Scientific and Medical (ISM) band. Such a tag can be typically accommodated in a small container and/or may be incorporated into an object or mounted on a person or animal. Reader 11 can be coupled to a host system such as a portable or fixed terminal. Both the reader 11 and the tag may be mobile devices. It will be understood that in some embodiments of the invention one or both of the reader and the tag may be fixed.

Figure 5A:
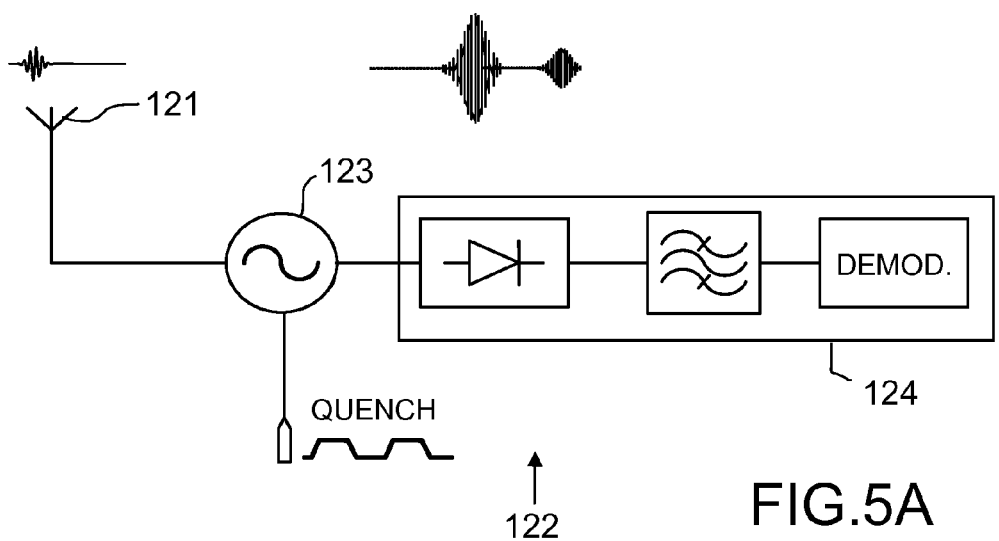
FIG. 5A is a schematic diagram of the super-regenerative circuitry of an RFID tag of FIG. 4 according to an embodiment of the invention.

The communication transceiver of RFID Tag 12 of the first embodiment of the invention is illustrated in more detail in FIG. 5A and comprises the antenna 121 for transmitting and receiving RF signals and a super-regenerative circuit 122 including a super-regenerative oscillator 123 and a signal processing module 124. The signal processing module includes an envelop detector followed by a low pass filter and a demodulator that could include digital processing. The operation of such a super-regenerative circuit is based on the repeated build-up and decay of self-oscillations in the oscillator 123. The oscillator 123 is arranged to receive a periodic quench signal to allow build-up and dampening of the self-oscillation. This signal enables a external control of the damping factor of the oscillator 123. Without any external signal the build up of the oscillations starts from thermal noise which can be a relatively slow process. By applying an incoming RF signal of sufficient energy, for example from the reader 11, the build-up of oscillations becomes more rapid. The advantages of using a tag based on a super-regenerative receiver is that such a receiver has a simple structure and low power consumption. These features make super-regenerative receivers well suited for wireless short distance communication.

Figure 5B:
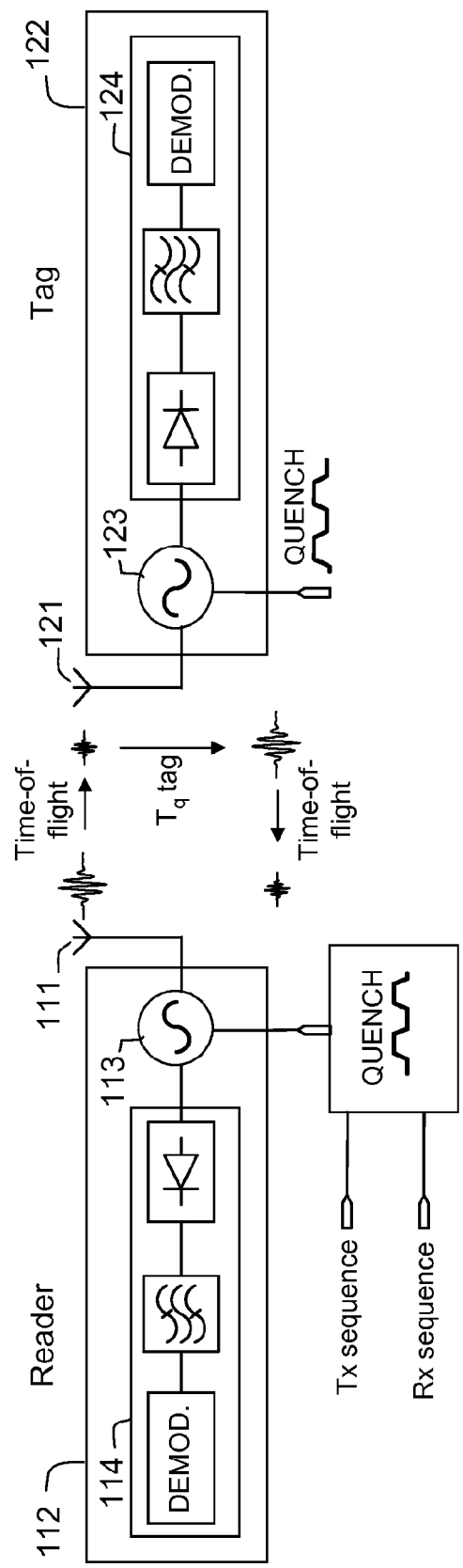
FIG. 5B is a schematic representation of the RFID reader and tag of FIG. 4 according to an embodiment of the invention.

FIG. 5B illustrates in more detail the communication transceiver of RFID reader and tag of FIG. 4. The reader 12 has a similar structure to the tag 11 and includes an antenna 111 for transmitting and receiving RF signals and a super regenerative circuit 112 including a super regenerative oscillator 113 and a signal processing module 114. The super regenerative oscillator 113 operates in a similar manner to the super-regenerative oscillator of the tag 12. The RF front-end of the two transceivers 11 and 12 is similar to each other and the same signal path can be used for transmission and reception. Amplification stages have been omitted between the oscillator and the antenna due to short communication distance needed in RFID application, and to allow reflection of pulses inherent to super-regenerative transceivers In such architecture, since the sensitivity of the tag 12 is high only for a limited time, correct timing between the incoming RF pulse signal from the reader 11 and the quench signal applied to the tag 12 is very important to achieve correct detection by the tag 12 of the incoming signal. This is even more significant when using a short pulse signal as is the case in UWB communication rather than a continuous wave signal. In UWB applications the quench signal should be triggered when the incoming pulse is collected at the antenna 121 of the tag 12. The shorter the pulse-width, the more accurate the synchronisation should be. Indeed, in super-regenerative architecture the receiver sensitivity decreases if the correct instant is not reached. The method according to this embodiment of the invention provides a solution to fulfil this requirement.

Figure 6:
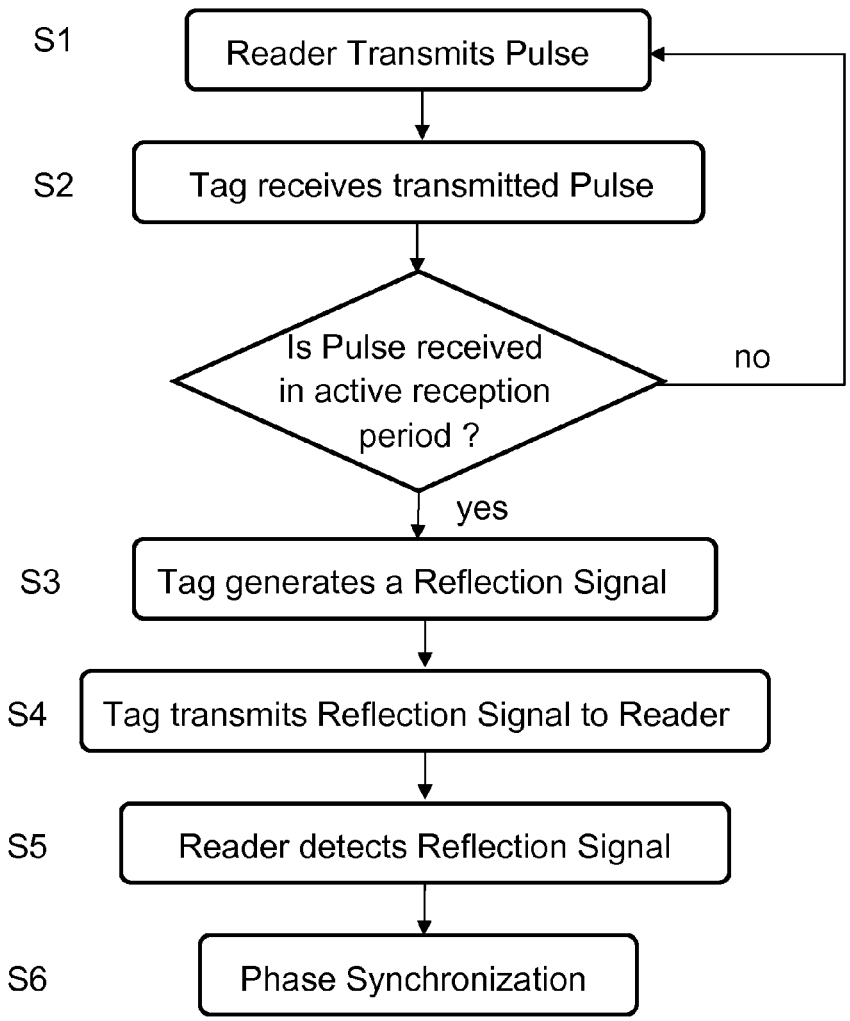
FIG. 6 is a flow chart illustrating a method of phase synchronisation between an RFID tag and reader according to at least one embodiment of the invention.
Figure 7:
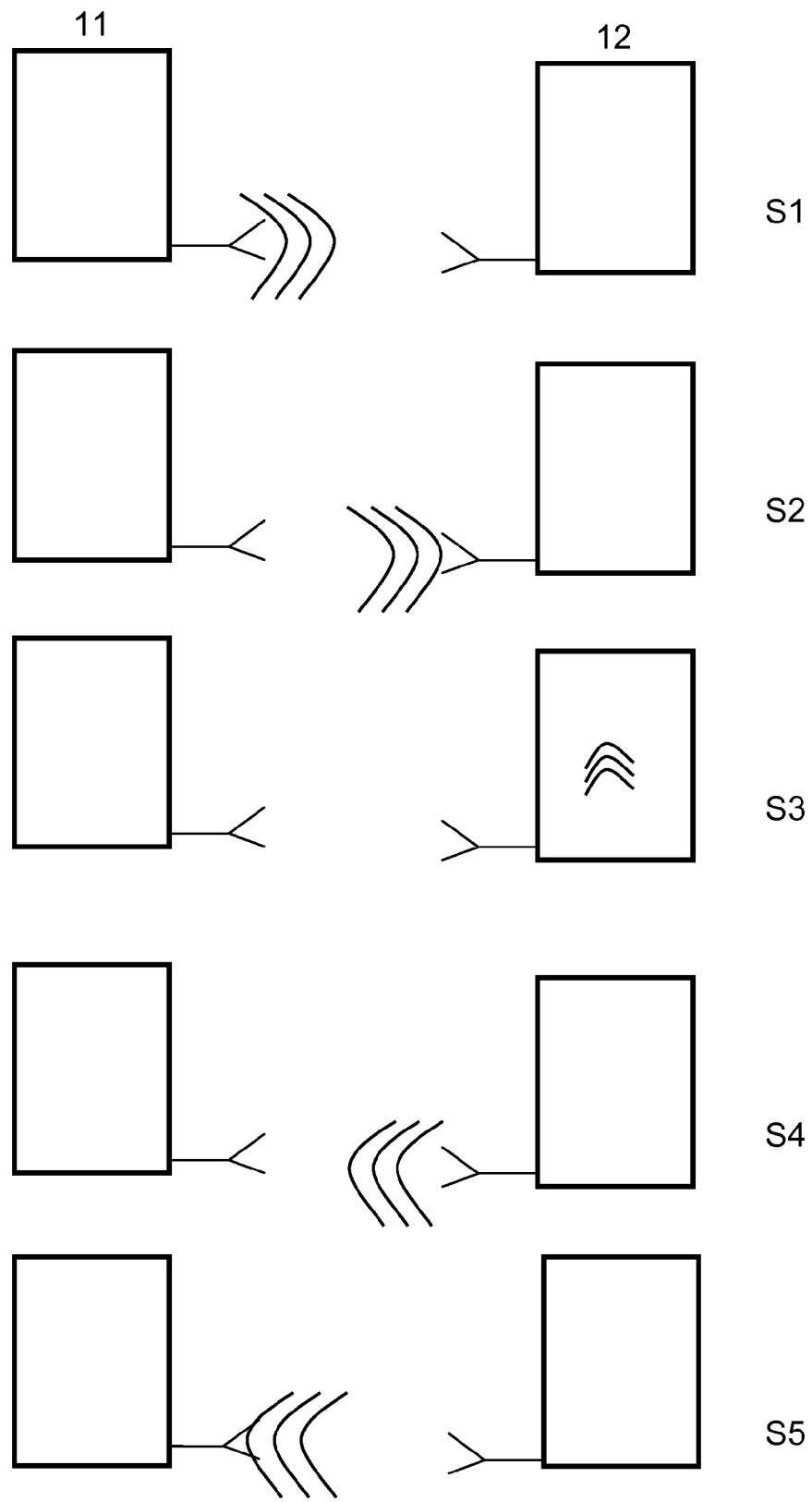
FIG. 7 is a schematic diagram illustrating the method of phase synchronisation according to at least one embodiment of the invention.
Figure 8:
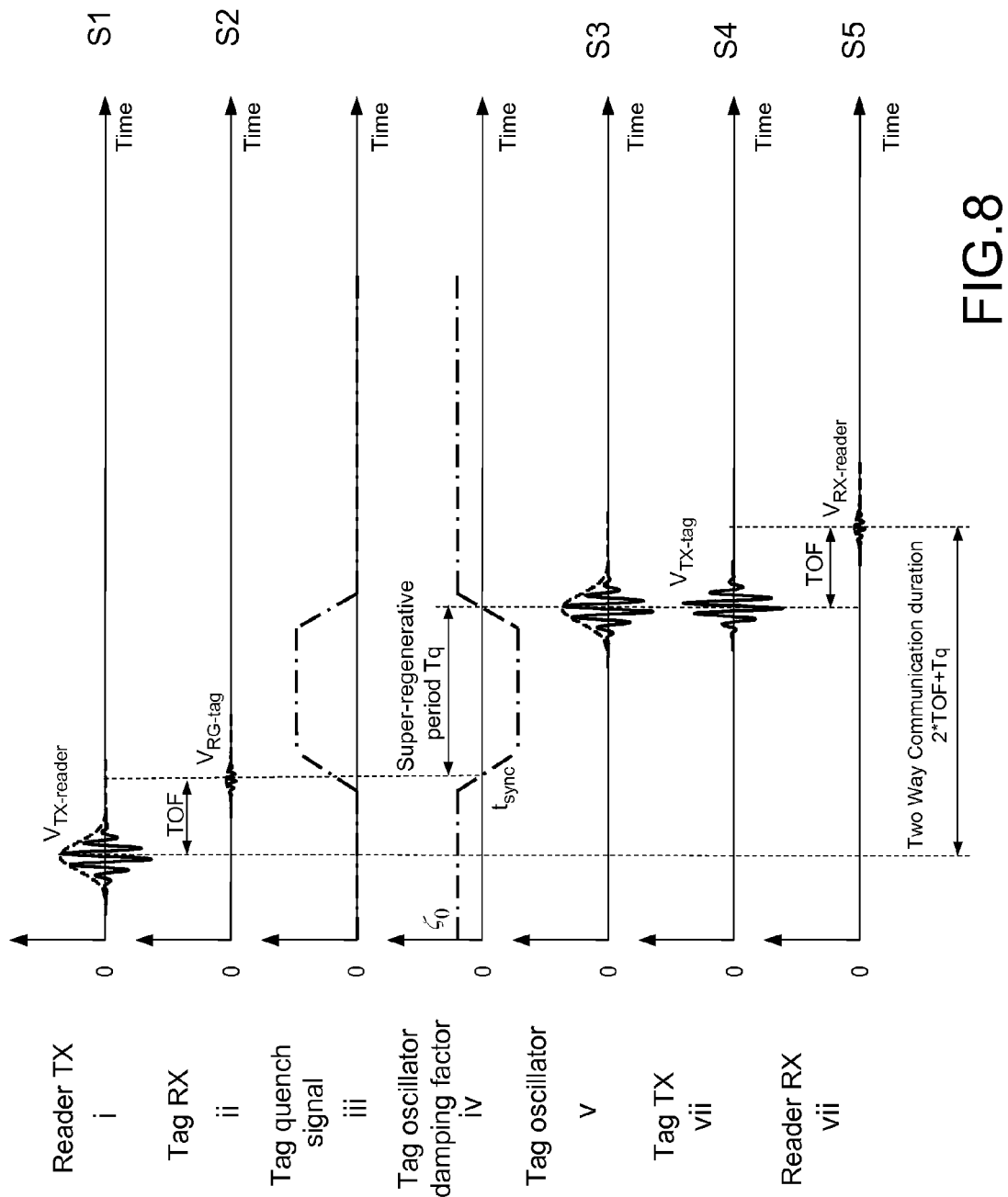
FIG. 8 is a graphical representation of the method of phase synchronisation according to at least one embodiment of the invention.

A method of phase synchronisation for pulsed UWB RF communication between the reader 11 and the tag 12 of the RFID system according to at least one embodiment of the invention will now be described with reference to FIGS. 6 to 8. The method may be implemented by a computer program product programmed to carry out the method or a chipset comprising one or more chips configured to execute the method.

Reader 11 transmits a UWB pulse signal via antenna 111 (S1) to tag 12. After a time-of-flight (TOF) period the pulse signal, attenuated due to propagation loss, arrives at the antenna 121 of tag 12 (S2). If the transmitted pulse signal is received in a timeslot corresponding to application of the quench signal to super-regenerative oscillator 123 of the tag, i.e. during an active reception timeslot of the tag 12, the oscillation of the oscillator 123 is amplified during the super-regenerative period or quenching period Tq to a level which is detectable by the tag receiver S3. The super-regenerative period Tq enables the oscillation signal to be re-generated due to the path loss compensation achieved by the super-regenerative gain. Optimal synchronisation between application of the quench signal and reception of the incoming pulse implies that at $t_{sync}$ the peak envelop of the incoming pulse corresponds to the time when the damping factor, controlled by the quench signal, of the oscillator becomes negative as illustrated in FIG. 8($iv$). If no incoming pulse signal is received at the input of tag 12, the oscillation will start in any case due to noise. However the resulting amplitude of the oscillation which is achievable will be significantly lower (by at least one order of magnitude) than if there was an incoming pulse signal at the beginning of quench signal. If the timing between the incoming pulse signal from reader 11 and application of the quench signal to the super-generative oscillator 123 of tag 12 is correctly synchronised the oscillation generated in the super-regenerative oscillator 123 will be of detectable amplitude resembling the pulse signal illustrated in FIG. 8(*v*).

The timing of the oscillation peak can be fine-tuned by adjusting the parameters of the quench signal. Both quench signal amplitude and duration enable the amplitude of the oscillation to be fine tuned.

In the architecture of the RFID tag circuitry 120 illustrated in FIG. 5A the oscillator 123 is directly coupled to the antenna 121. As a result, the oscillations produced across the oscillator 123 can be directly re-radiated by the antenna 121 S4.

The leaking or reflection of the oscillating pulse is a typical characteristic of a regenerative receiver which in contrast to the prior art is efficiently used in the method of this embodiment of the present invention. This phenomenon is traditionally seen as a problem in super-regenerative narrow band systems since the reflected signal interferes with the incoming signal itself. This is due to the inherent continuous wave form used in narrow band solutions. This however is not the case in UWB communication since two signals are separated in time and due to the short pulse duration, there is no overlap. This makes it possible to eliminate the power hungry low noise amplifier (LNA) stage between antenna and oscillator required in prior art narrow band super-regenerative architecture.

The time delay between the incoming RF pulse signal and the reflected RF signal can be extended by fine-tuning the quench signal duration (Tq). Accordingly, the duration of the quench signal can be selected so that the time difference between the incoming RF pulse signal and the reflection signal transmitted from the tag is suitable for the detection of the reflection signal in the reader side. As illustrated in FIG. 8(*v*), without proper isolation between the antenna 121 and super-regenerative oscillator 123, the pulse signal generated by the oscillator 122 is radiated by the antenna 121 such that the peak value occurs after time Tq which is the duration of quench signal. In some embodiments of the invention the reflection signal may be amplified after generation with a suitable amplifier if required. In passive mass memory tags such as that of the present embodiment the feasible value for amplification is of the scale of a couple of decibels.

After the time-of-flight (TOF) the reflection pulse signal from tag 12 arrives at the antenna 111 of reader 11 S5 where it is detected by the reader. By detecting the resulting amplitude of the reflection signal, the reader 11 can obtain information about the tag 12.

The main idea behind the method according to this embodiment is the utilization of the inherent property of super-regenerative receiver in phase synchronization of pseudo-randomized pulse sequences. The method is based on the reflection of pulses transmitted by the reader 11 from a tag device 12. From the reader's perspective the reflection is delayed suitably so that time difference between transmission of the initial transmission pulse from the reader and reception at the reader of the reflection signal is reasonable. The reflection occurs only when the timing of the transmitted pulse from reader and timing of detection in tag matches correctly. The resulting reflection from the tag can be also detected by the reader. This moment of time detected by both ends of the system can be further used as a time-stamp for synchronized communication between the devices. Of course, an additional verification phase may in some cases be needed between the first matched reflection between the reader and the tag but the method is in any case faster and/or simpler than conventional synchronization methods traditionally used for synchronization of impulse UWB transceivers.

Since, in the present embodiment of the invention reader circuitry 110 is based on a super-regenerative oscillator similar to the tag circuitry 120 of tag 12. Detection of the reflection pulse in the reader is achieved by generation of a detection pulse in the super-regenerative receiver circuit. In some embodiments of the invention, however, the reader may not be operable to exploit reflections from reader to tag. Consequently, in such cases better isolation between the antenna and an oscillator of the reader may be provided in order to avoid unwanted reflection signals being transmitted from the reader to the tag. In addition, since the power resources of reader 11 are not as limited as that of the tag 12, in further embodiments of the invention it is possible to have a more complex transceiver implementation with better performance in the reader.

Figure 9:
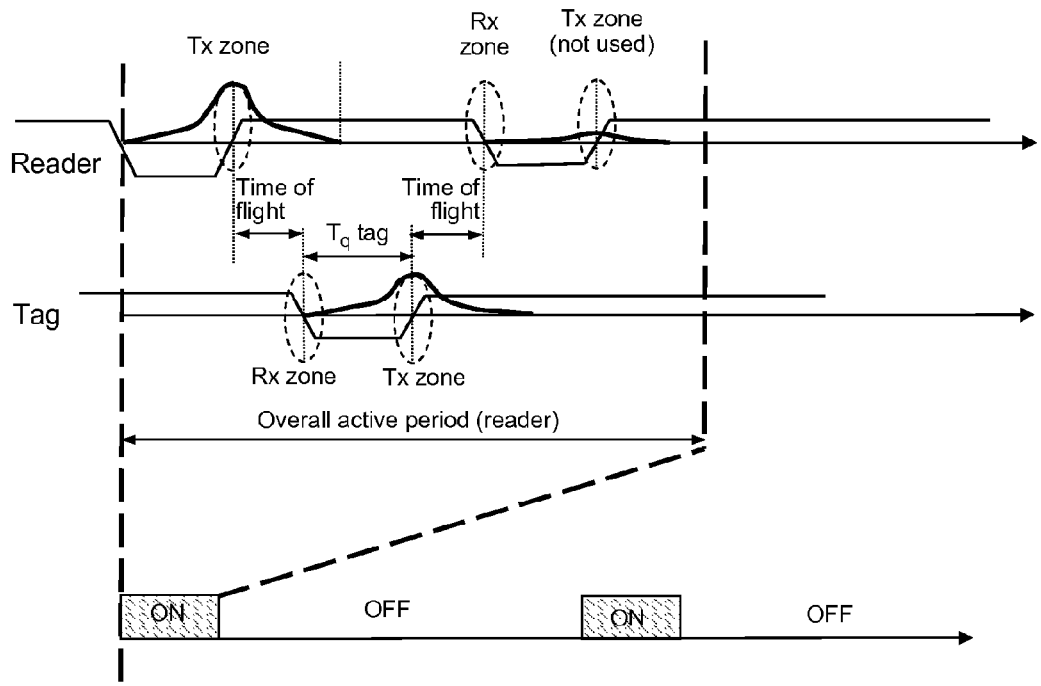
FIG. 9 is a graphical representation illustrating the timing of signals in the reader and the tag according to at least one embodiment of the invention without any time-hopping.

The overall timing of communication between the reader 11 and tag 12 is illustrated in FIG. 9 where timezone Tx defined by a dashed line represents the time of transmission of a pulse signal and timezone Rx defined by a dashed line represents the time of reception of a signal. A tag reflection pulse signal is generated in the super-regenerative oscillator of 123 of tag 12 in response to reception of the transmission pulse signal from the reader and the reader reflection pulse signal is generated in the super-regenerative oscillator of the reader 11 in response to detection of the reflection pulse signal from the tag 12. In this embodiment of the invention the duty-cycle of the reader 11 is greater (more than twice) than the duty-cycle of the tag 12 since in the reader the transmission pulse signal is generated for transmission. Since in this embodiment of the invention a super-regenerative receiver is used in the reader 11 to detect the reflection pulse signal, the incoming reflection pulse signal should be amplified which can take as long as the transmission. In addition, the reader should take into account the bi-directional time-of-flight of a signal from reader to tag to reader. However, with short distances which are likely in the case of a high-rate RFID system, the time-of-flight of a signal from one transceiver to the other is in scale of several hundreds of picoseconds. At a distance of 30 cm the time-of-flight in free space is roughly 1 ns (bi-directional TOF 2 ns). However, if the method according to this embodiment of the invention is applied in low data rate systems with greater distances between transceivers, such as, for example UWB positioning systems, the time needed for propagation will be significantly longer.

Figure 10:
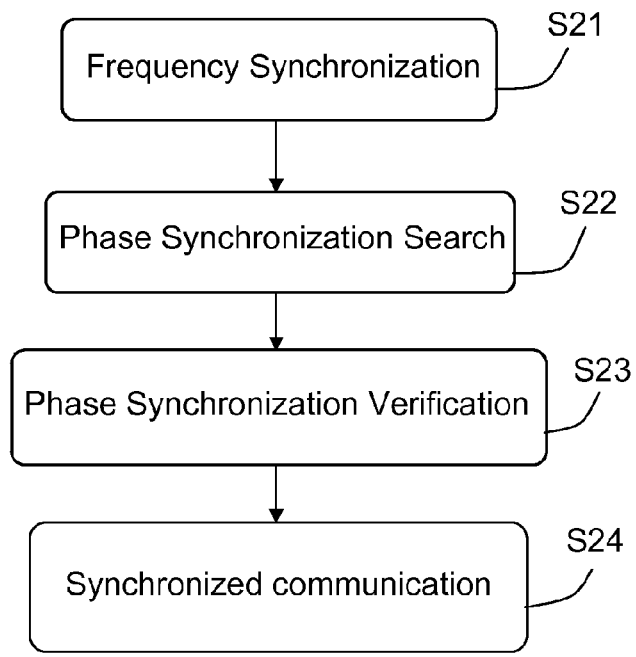
FIG. 10 is a flow chart illustrating the overall method of synchronisation between the reader and tag of at least one embodiment of the invention.
Figure 11:
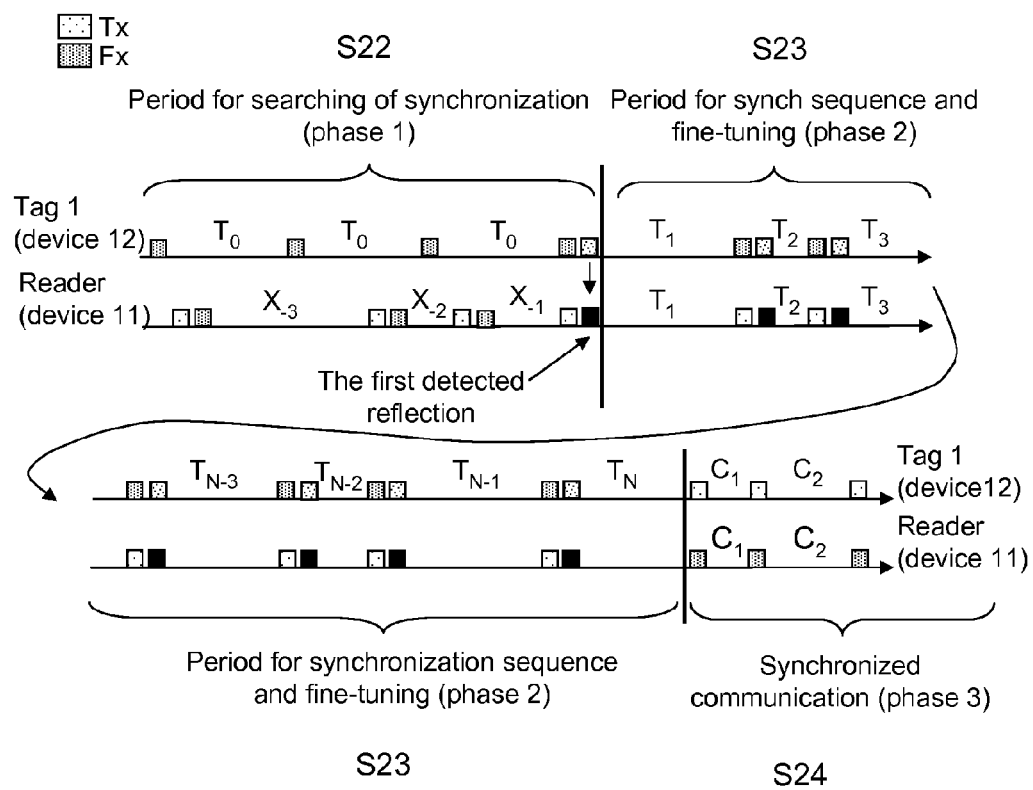
FIG. 11 is a timeline illustrating the method of FIG. 10.

The implementation of the phase synchronisation method according to at least one embodiment of the invention in a full synchronisation procedure between a reader and a tag of an RFID system is described with reference to FIGS. 10 and 11.

The full synchronisation procedure can be divided into four or more steps: frequency synchronisation (S21), search of synchronisation pulses (S22) and synchronisation verification (S23). After the verification phase the actual data transfer or communication can be executed (S24).

The synchronisation procedure or at least the verification phase can usually be repeated after a certain period of time to ensure that the synchronisation is still correct.

Example of methods which may be used for the step of frequency synchronisation (S21) are a method based on common continuous wavelength (CW) signal shared between the devices for extracting a mutual clock reference, or an alternative method wherein both the reader and the tag have frequency synthesizers that are accurate enough and which do not drift significantly in frequency during one communication packet. A high bit-rate RFID could be based on the first alternative.

After the frequency synchronisation step (S21) the clocks of the reader and the tag run on the same frequency. At this stage, however, the reader and the tag are in states in which they are not aware of the phase of their counterpart device. Next, one of the devices, for example, the reader starts transmission of the phase synchronisation search S22 by transmitting a sequence of transmission pulses Tx. Since the transmission of short periodical pulse sequences may not be feasible according to UWB regulations the synchronisation sequence may for example be a time-hopping sequence which results in a sufficiently smooth transmission spectrum. The transceiver of the reader is arranged such that after each transmitted pulse Tx, the reader can verify the existence of a reflection pulse signal as described above. On the tag side the super-regenerative receiver is activated by a quench signal according to its own pre-defined synchronisation sequence. In other words, the quench signal of the tag controls the damping factor of the super regenerator oscillator and thereby enables instability of the oscillator according to a pre-defined sequence. The code sequence could be optimised depending on the environment context e.g power supply availability, numbers of tags in the field, interferers issues.

Although the duty cycle of the receiver in the tag is low, the reception sequence is optimized so that at least one of the active reception periods of the tag matches with high probability an incoming transmission signal from the reader during the phase synchronisation search S22. The separation between the quench periods (Tq) of the Tag 12 can be constant which can help to speed up the matching between the transmission by the Reader 11 and reception by the Tag 12. Optimized pseudo-random codes may also be used in the quench sequences of the Tag 12 during S22. The reader continues the transmission of pulse signals until it detects a reflection signal from the tag indicating correct timing between the reader and the tag for one pulse or until a state machine of synchronisation process counts to the end of pre-defined counter value. If the timing of the transmission pulse signal from the reader and quench period of the receiver in the tag matches, the incoming transmission pulse is reflected back from the tag 12 in the form of a reflection signal and detected by the reader 11. A detectable reflection pulse signal occurs only when the signal generated by the super-regenerative oscillator 123 in the tag 12 attains a sufficiently high amplitude in response to the incoming transmission pulse to exceed a detection level, during the quench period. Since the correct timing between a transmission pulse Tx and a quench period of the tag is detected immediately by both devices, phase synchronisation verification S23 can be started after the first match has occurred in the phase synchronisation search S22.

In the phase synchronisation verification phase S23 fine-tuning of timing between transmission pulse signals from the reader 11 and the quench signal of the tag oscillator 123 can be executed, and correlation between synchronisation sequences ensured. The time-hopping sequence of synchronisation code is pre-defined so that both the reader and the tag can follow the sequence. As mentioned, the frequency synchronisation is implemented by other means and therefore the assumption is that both devices can follow the time-hopping sequence with sufficient accuracy after the beginning of the sequence has been defined by the first detection of a reflection pulse signal. If the first reflection is not intentional, for example, a reflection signal is detected in the reader due to interference, reflections for the rest of the time-hopping sequence are likely not to occur and the reader may return to step S22 the synchronisation search. If the correlation is not good enough or the synchronisation is lost during the verification phase S23 both devices may return to step S22 and start over.

After a sufficient period of time, i.e. a sufficiently long synchronisation sequence, the possibility of false alarm is sufficiently small. The synchronization between the reader and tag is then deemed to be good enough and the communication can be started. In the communication phase it is not necessary to detect reflected pulse signals. However, a reflection signal can be used in some embodiments of the invention, to transfer acknowledgement information, for error checking or for error correction purposes. Synchronisation verification step S22 can be repeated after a certain period of time to ensure that synchronisation is still good enough. If the connection is lost during the communication phase S23 both devices can start again from phase synchronisation search phase S22 or even from frequency synchronisation phase S21 if frequency synchronisation is also lost.

Figure 12:
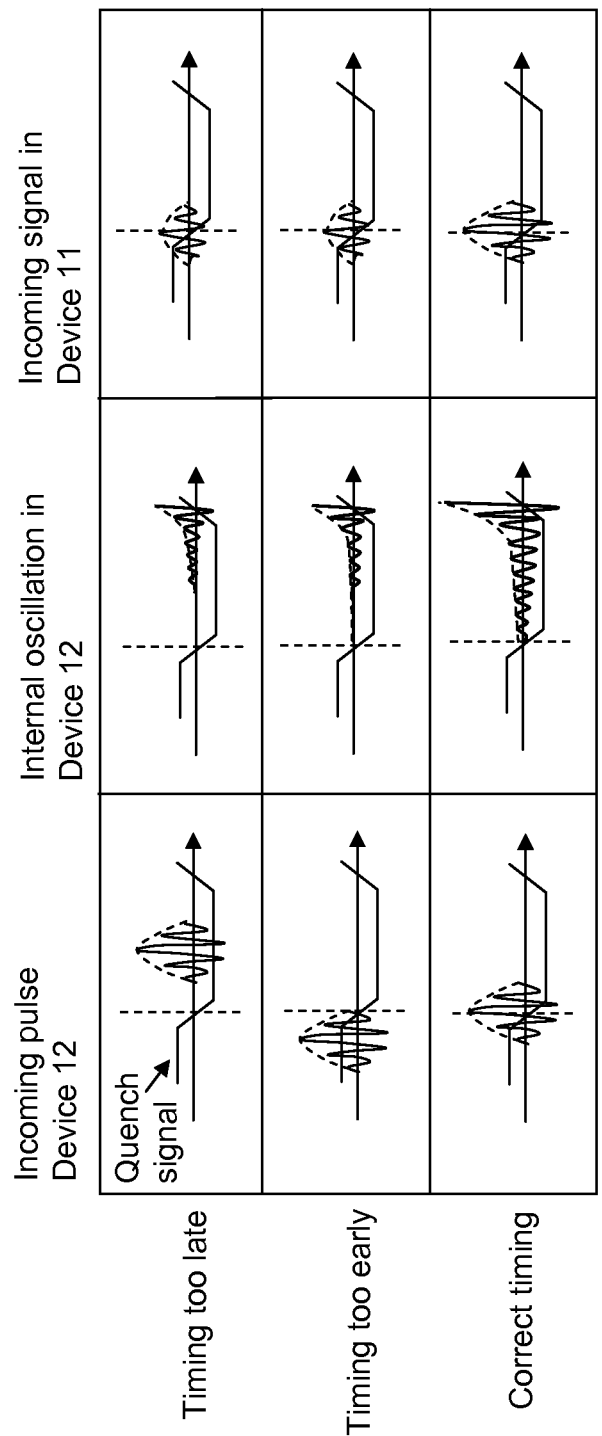
FIG. 12 is a graphical representation of a method of fine tuning phase synchronisation according to at least one embodiment of the invention.

With reference to FIG. 12 fine tuning of synchronisation can be carried out in the phase synchronisation verification stage by the reader using one or more, and in some cases each of the detected reflection signals by measuring the peak value of the resulting oscillation in the super-regenerative receiver of the reader. After the phase synchronisation search period S22 the reader and tag or tags can continue the synchronisation procedure in the phase synchronisation verification period S23 and the pulses are then transmitted from the reader and reflected from the tag according to a pre-defined sequence. If the timing between reader and the tag is not optimal the peak value of the internal oscillation in tag 12 is lower than achievable with the best possible timing. The peak value of internal oscillation triggered by the reflected pulses in the reader 11 can be measured and timing of synchronisation pulses can be fine-tuned accordingly to better match with the timing of tag.

Figure 13:
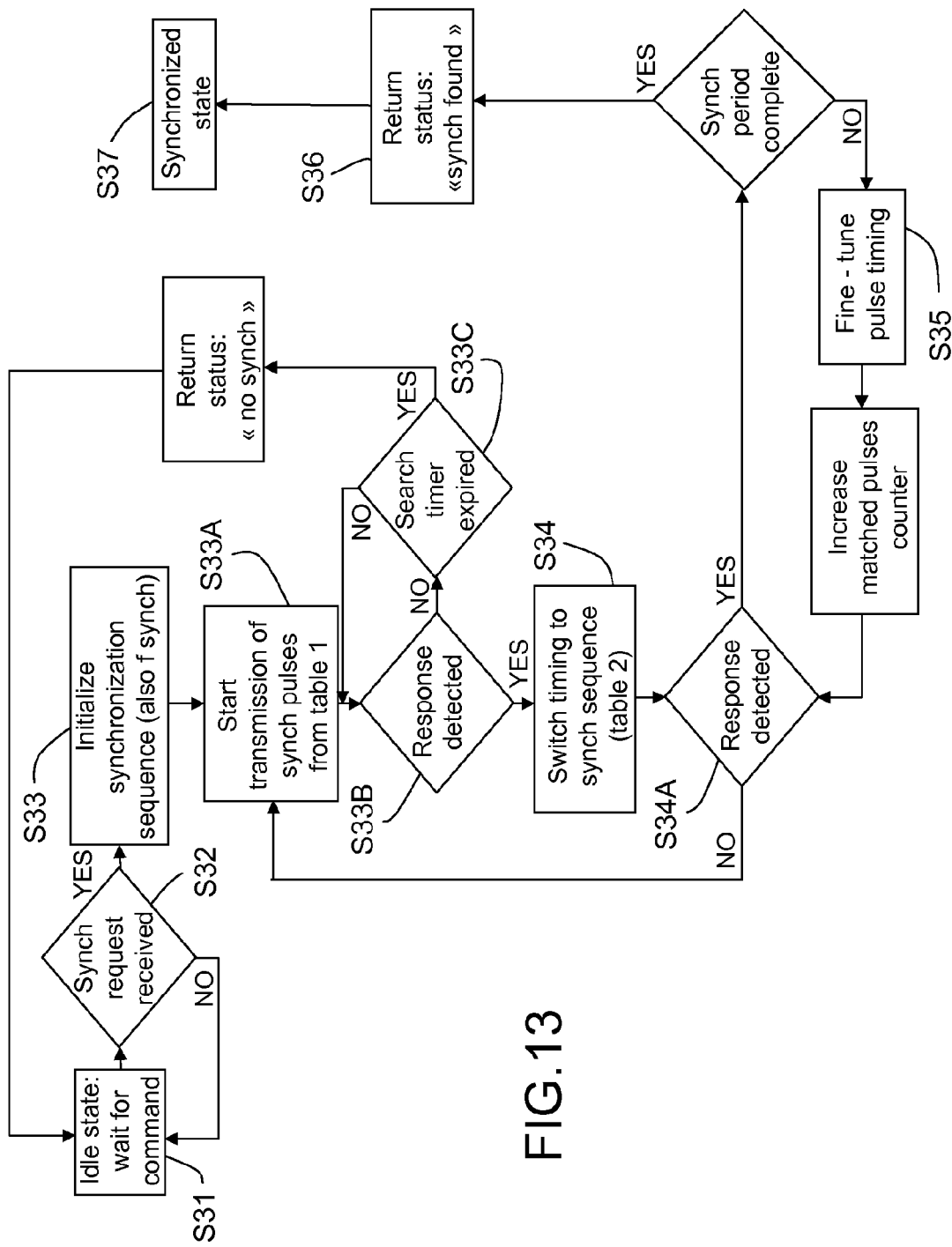
FIG. 13 is a flow chart illustrating the steps of the method according to at least one embodiment of the invention in a reader.
Figure 14:
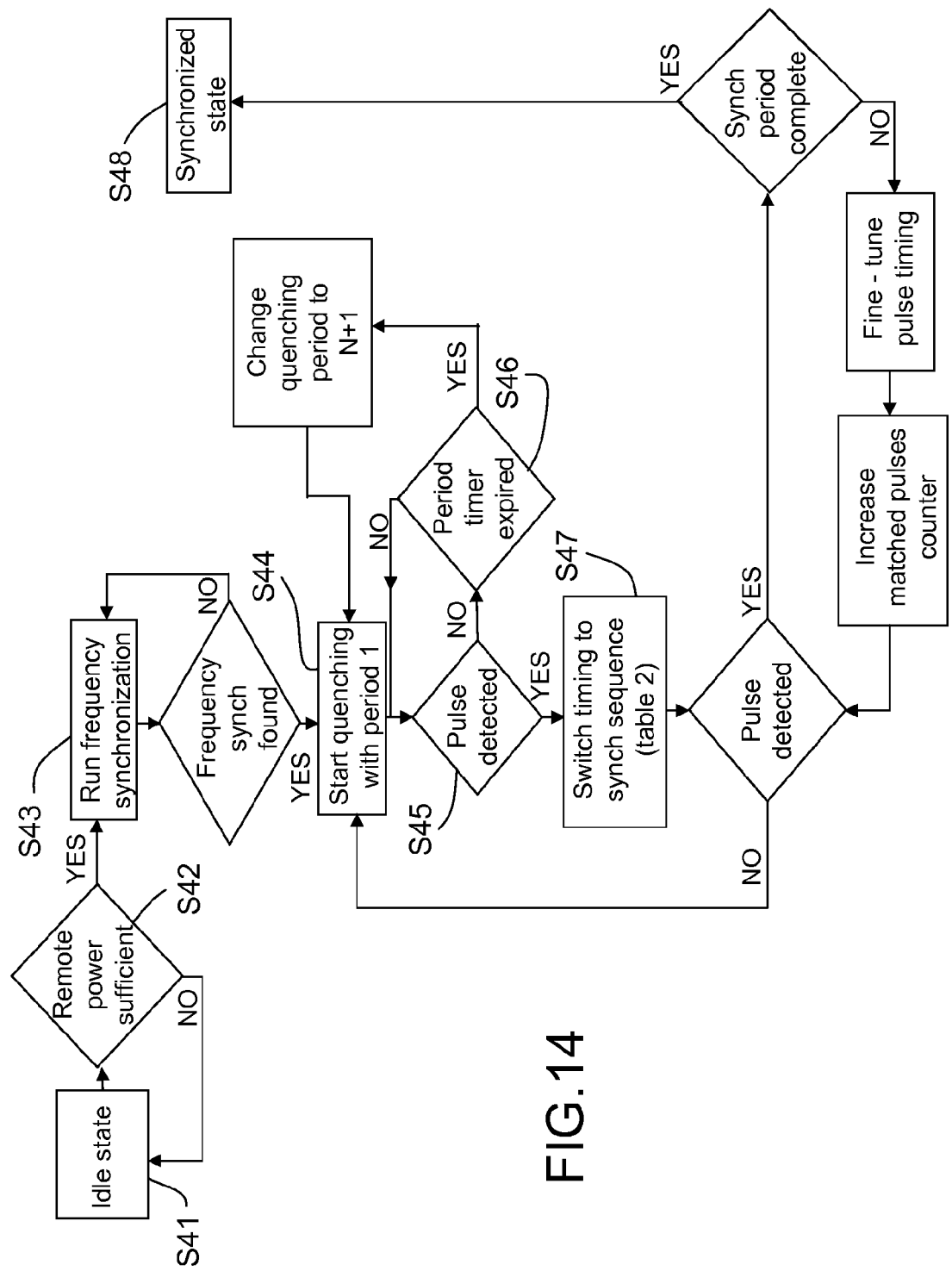
FIG. 14 is a flow chart illustrating the steps of the method according to at least one embodiment of the invention in a tag.

FIG. 13 illustrates in more detail the overall synchronisation procedure according to some embodiments of the invention from the perspective of a reader and FIG. 14 correspondingly illustrates the same procedure from the perspective of the tag.

With reference to FIG. 13 the reader 11 starts in the idle state S31 awaiting a synchronisation command. As soon as the synchronisation command S32 is given by the upper layers of the system with which the reader is associated, the synchronisation process is initialized S33 starting with frequency synchronisation, by, initiating UHF CW transmission for example. When the initialization period has expired the system continues to the phase synchronisation search stage S33 and starts to transmit synchronisation pulses S33a according to the pre-defined time-hopping schedule. The phase synchronisation search phase will continue until the reader detects a response S33b or until a specified counter counts to zero S33c. If the counter counts to zero during this phase, the status that no tags were found will be reported to upper layers of the system and the reader will return to the idle state S31. Otherwise, if the reader detects a reflection signal, it will continue to the phase synchronisation verification phase S34 and will start the correlation of reflections and the timing fine-tuning procedure S35 if implemented. If reflection signals are lost or are not detected during this phase the reader may return to the phase synchronisation search stage S33A. If the whole synchronisation sequence is detected with high enough correlation, the system may enter the synchronised communication phase, return the status with "synchronisation found" flag to upper layers S36 and start to transfer actual data from/to the tag in question S37.

With reference to FIG. 14 the tag starts correspondingly from the idle state S41. As soon as the power level of the tag is high enough S42, the tag may run the frequency synchronisation procedure S43 and lock with the UHF CW signal. The tag may then enter the phase synchronisation search phase and start to quench the control signal of oscillator S44 according to the pre-defined schedule. The tag will continue until it detects a pulse S45 or until it counts to the end of the time-hopping sequence S46. After the first sequence it may enter a new sequence or continue from the beginning of the first one (the pulse repetition rate of the quench sequence can be also constant). If the tag detects a pulse during the phase synchronisation search phase it will go directly to the verification phase S47. The verification phase will be executed according to the schedule of synchronisation pulses and if the correlation is high enough the system may enter the actual synchronised data transfer state S48.

In comparison with the prior art methods the method according to the invention provides an immediate acknowledgement to confirm the synchronization in UWB impulse radio communication. Based on the acknowledgement information the synchronization process can be accelerated in comparison with the methods traditionally used in UWB communication since the length of one synchronisation sequence may be even a single transmission pulse.

Figure 15:
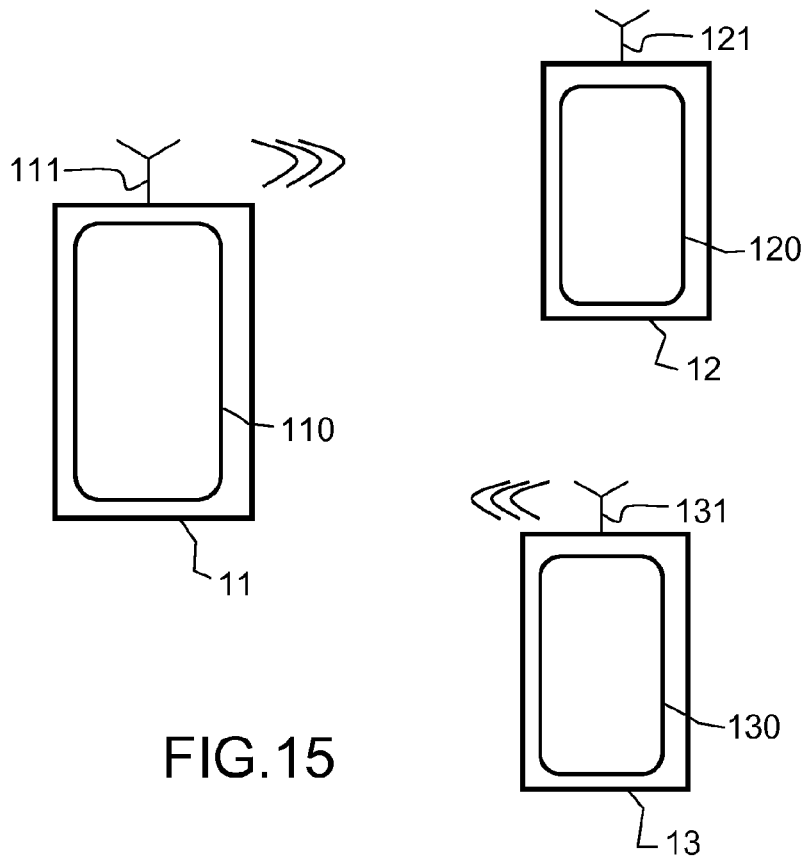
FIG. 15 is a schematic diagram of an RFID reader and two tags according to at least one embodiment of the invention.
Figure 16:
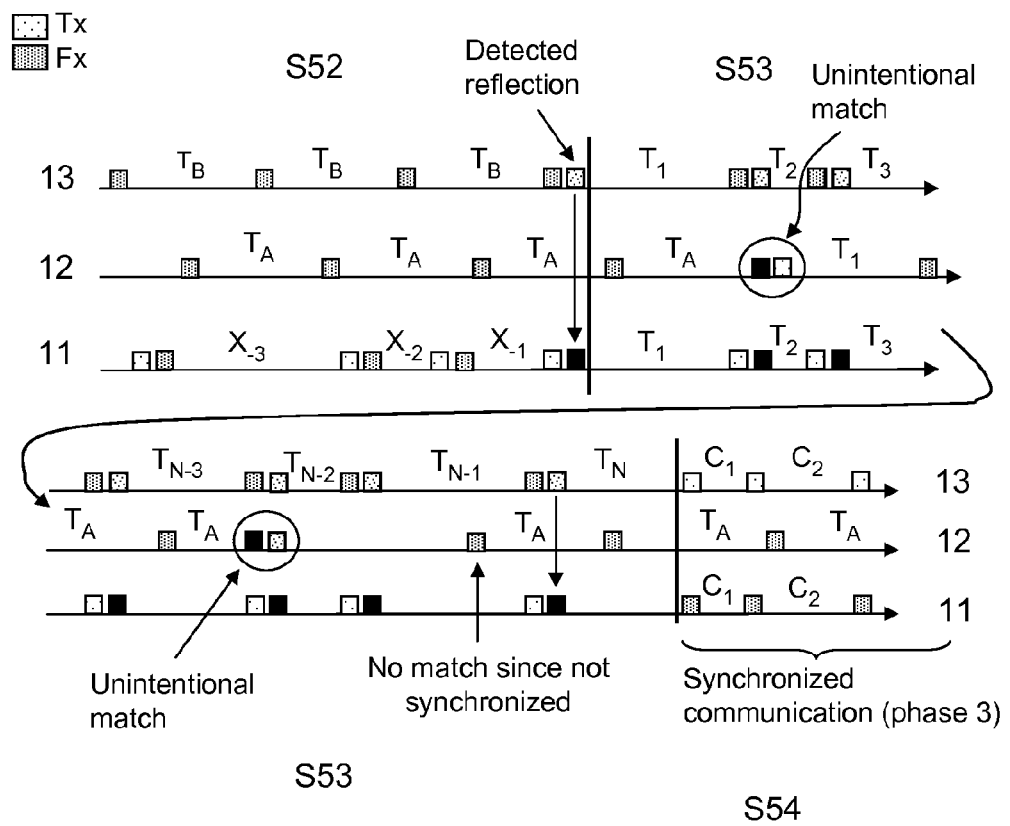
FIG. 16 is a timeline illustrating the method of phase synchronisation according to at least one embodiment of the invention.

It will be appreciated that in some embodiments of the invention an RFID system may need to be capable of supporting the presence of multiple tags within the communication range or coverage area of the reader. In such cases the synchronisation scheme must be able to support multiple-access. The method according to the first embodiment of the invention can be easily extended to support access of more than 2 tags. FIGS. 15 and 16 illustrate the use of a method according to a second embodiment of the invention in the case where two tags 12 and 13 are in the proximity of a reader 11. Tag 13 operates in a similar manner to tag 12 as previously described.

In the phase synchronisation search step S52 both tags 12 and 13 listen for the search sequence of transmission pulses transmitted by the reader 11. It is likely that the listening periods of tags 12 and 13 will not be phase synchronized. Phase difference of listening periods of the tags may be achieved by using known methods—the selection of listening period may for example include some random process and the period may also change after a certain period of time. Depending on the duty cycle of tag reception activity multiple tags can be active simultaneously without overlapping. As soon as the active reception period of one of the tags, for example tag 13, matches with the transmission from the reader 11, reader 11 and tag 13 may enter the phase synchronisation verification stage S53. If during the phase synchronisation verification stage S53 between tag 13 and reader 11, tag 12 detects an incoming pulse and transmits a reflection pulse, the timing is presumed to be wrong since tag 13 and reader 11 have already proceeded to the phase synchronisation verification stage according to pre-defined time-hopping sequence—i.e. reader 11 should be in sequence with tag 13 which has a different active reception period to tag 12. Tag 12 may detect pulses transmitted by tag 13 or reader 11 which are indicated by the first and second circle on the tag 12 time-line of FIG. 16. However, since tag 12 should not detect any further pulse after time period T1 it will return to the phase synchronisation search stage S52 after an erroneous detection or unintentional mismatch.

In some embodiments of the invention the communication system may also include a so-called back-off mechanism which allows the tags to turn off the reflection mechanism after a certain number of wrong sporadic detections. This would help to decrease the interference in the communication between tag 13 and reader 11. Moreover, tag 12 may enter a back-off stage if reader 11 has already achieved phase synchronisation with it but the reader 11 wants to continue in the scan mode to detect all the tags one by one within the communication range.

In some embodiments of the invention after the first synchronisation process and after the first tag has been identified the reader may set the tag into a "do not respond" state. This means that the tag will not respond to synchronisation pulses during a certain period of time which offers better possibilities for other tags to be found by the reader.

During the synchronised communication phase S54 collisions caused by tag 12 can be minimized for example by selecting a new synchronisation word for the synchronised communication phase instead of the default one used for the phase synchronisation verification phase. Other devices may start from the sequence used in the phase verification phase but tag 13 would start from the sequence defined by reader 11 at least for a certain period of time.

The use of super-regenerative architecture for UWB communication is attractive in the above described embodiments of the invention since the weaknesses of pulse reflection in narrow band solution can be exploited advantageously for synchronisation purposes. The proposed method thereby enables and improves the use of such receivers in impulse UWB communication.

The synchronisation method according to the invention is however not limited to super-regenerative transceivers it will be appreciated that in further embodiments of alternative circuit architecture may be used.

Figure 17:
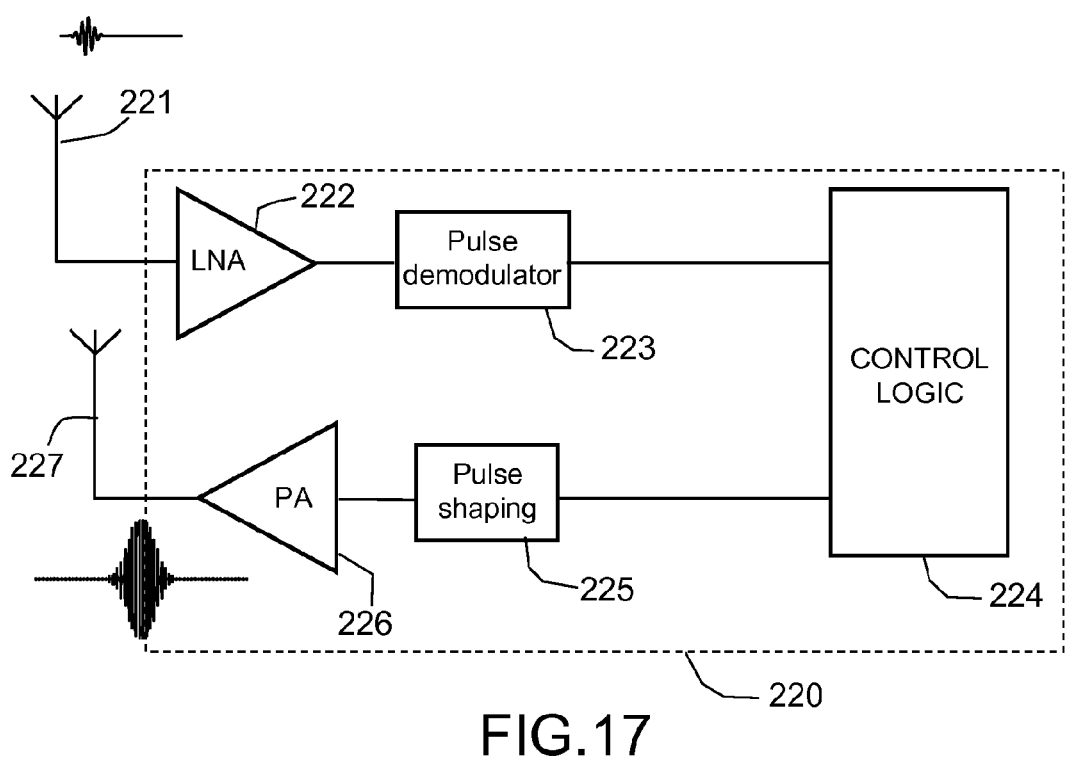
FIG. 17 is a schematic diagram of tag and/or reader circuitry according to an alternative embodiment of the invention.

A further embodiment of the invention using an alternative circuit architecture in the tag is illustrated in FIG. 17. The circuitry 220 according to the further embodiment of the invention comprises a low noise amplifier LNA 222 coupled to a receiver antenna 221, a pulse demodulator 223 coupled to the LNA 222, control logic 224, a pulse shaping module 225 and amplifier 226 coupled to a transmitter antenna 227. The active reception period of the device can be defined by the control logic.

At regular time intervals the pulse demodulator 223 checks for an input pulse at antenna 221. If an input pulse is detected the pulse shaper module 225 generates a pulse under the control of control logic 224 and transmits the pulse to a reader device via pulse amplifier 226 and transmission antenna 227. The pulse can then be detected by the reader to indicate correct synchronisation between the reader and the active receptive period of the tag.

The alternative circuitry may also be implemented in the reader.

It will be appreciated that in alternative embodiments of the invention a single antenna, with for example an antenna switch, can advantageously replace the two antennas 221 and 227 of the previous embodiment.

Those skilled in the art will appreciate that although the principle of phase synchronisation has been described with reference to a RFID system for illustrative purposes the method may be used to synchronise other types of transceivers in UWB communication systems. For example, the method according to the invention may be utilized to achieve synchronisation between UWB positioning devices where power consumption of beacons should be kept to a minimum. After the synchronisation, distance estimation based on time-of-flight (TOF) of a transmission signal and/or a reflection signal, for example, can be executed. In such systems the required data rate will be lower and the communication range wider.

In further embodiments of the invention ciphering or locking of the data content in a tag can be carried out based on a mutually agreed time-hopping sequence between the reader and the tag. This time-hopping sequence can be then utilized after the normal synchronisation procedure to provide security during the transfer of private data. If the time-hopping sequence is not known by the reader, meaning the reader is not permitted to access the data in the tag, the reader will with very high probability loose the synchronisation with the tag if the sequence is long enough.

It will also be appreciated that the principle of reflection can also be exploited in both directions. Accordingly, the tag may also be capable of detecting the reflection from the reader when data is transferred from the tag to the reader. This would be practical when transferring data from a tag to a reader since the tag may automatically get the acknowledgement information from the reader. Errors may be detected and corrected by applying a similar method.

Figure 18:
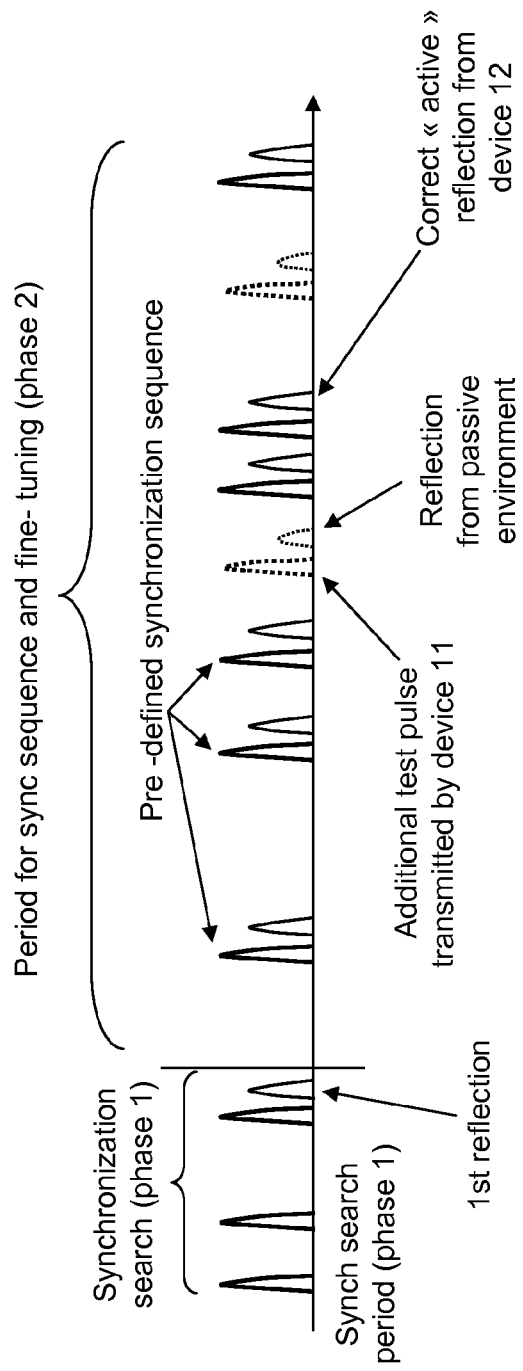
FIG. 18 is a graphical representation of a method of reducing unwanted reflections according to an embodiment of the invention.

Since RF pulses transmitted by the reader may also be reflected by other passive structures within the area of coverage, it may be advantageous in some embodiments of the invention to make a measurement of the propagation environment by using test pulses during the sequence synchronisation verification period. Accordingly, after the reader has detected the first reflected pulse and starts to transmit a synchronisation sequence according to the pre-defined time-hopping scheme it may also transmit some additional pulses which should not be in synchronisation with the detection sequence of the tag. This is beneficial since if some or all of the additional pulses are reflected back to the reader it may indicate that the pulses are unintentionally reflected from a reflective material or the like. If there is no reflection/response to the transmitted test pulses or the reflection is very weak, which may be also detected by the reader, the reader may conclude that it is synchronised to a real device. The procedure is illustrated in FIG. 18 in which the additional test pulse and corresponding reflection signal are represented as dashed lines and the synchronisation transmission pulse and associated reflection signal are represented as solid lines. The additional test pulses are transmitted during the phase sequence synchronisation verification period. In principle the testing measurement is possible also in the phase synchronisation search phase but in that case it's maybe not possible to verify if the tag is responding to the pulses or not. In the phase synchronisation verification period the tag should respond to the main transmission pulses according to synchronisation scheme. According to synchronisation scheme the tag should not respond to the additional test pulses. However, if too strong a reflection occurs and is detected by the reader the conclusion might be that there is a reflecting layer in the vicinity of the reader and communication is hindered. On the other hand, the quench signal of tag may be defined so that the correct reflection occurs after a certain period of time and not immediately after the bi-directional time-of-flight. In addition, the tag should amplify the reflection significantly as explained above and therefore the correct reflections should be much stronger than the phantom reflections from passive objects.

In further embodiments of the invention the strict requirement for the timing of reflected pulses can be used to limit communication range below a certain limit. This might be necessary to increase privacy in short-range communication i.e. to avoid reading of mass memory tags from a distance with "spying" devices which use high power levels which exceed regulatory limits, and which have a longer communication range than intended. For example, a period where the tag detects the reflections from the reader, or vice versa, can be used to detect that the response time is short enough and to prevent the reflection being generated from a distance longer than the privacy limit, for example. In addition, the distance measurement based on reflected pulse signals could be used advantageously in connection set-up protocol to improve logical usability of the system. In the case where more than one tag exist within the reading range of the reader, the communication protocol may be implemented so that the nearest tag is accessed first or listed first in the list of found tags which is then presented on the user-interface of the reader.

It will also be appreciated that in some embodiments of the invention multiple parallel super-regenerative receivers can be used, for example, in devices having sufficient power resources to accelerate the synchronisation process. The detection intervals could be interleaved between the super-regenerative receivers.

It will also be appreciated that the duty-cycle of super-regenerative receiver can be increased in the synchronisation phase to speed up the synchronisation if the power level allows higher power consumption.

Although in the embodiments described above the synchronisation sequence is initiated in the reader, it will be appreciated that in further embodiments of the invention the synchronisation sequence may be initiated by either the reader or the tag.

The skilled person will also appreciate that it will be possible to utilize the same reflection method, which has been described above for phase synchronisation, for actual data transfer between the devices. Information can be included into the reflected pulses e.g. by allowing and omitting the reflected pulses in the tag after the synchronisation has been ensured. However, the reflections are likely not to be needed continually during the data transfer if the synchronisation is good enough. Unnecessary detection of reflections would increase the power consumption of the whole system and therefore it may be more efficient to transmit data only in one direction when actual data is transferred. In addition, the method could also be used for acknowledgement characters and error correction.

Figure 19:
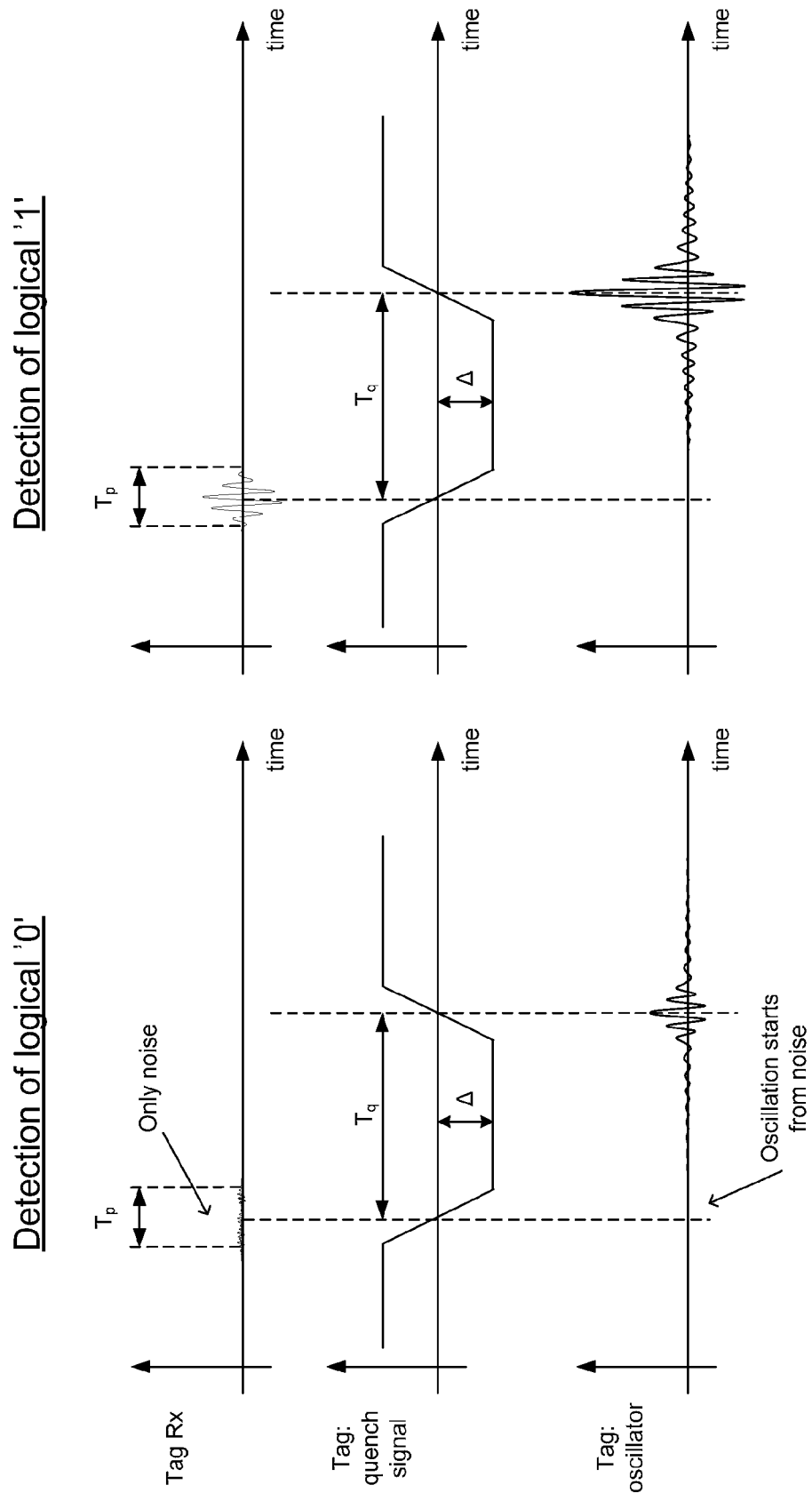
FIG. 19 is a graphical illustration comparing the detection of an incoming transmission signal and the detection of noise in a super-regenerative receiver according to an embodiment of the invention.

A potential problem related to usage of super-regenerative transceivers in an impulse UWB RFID system may be the transmission of reflection signals by the tag resulting from the input of noise or interference at the input to the antenna—such cases will be referred to hereafter as the detection of zeros (i.e. no incoming intentional transmission signal at the antenna of receiver). As presented in FIG. 19, the detection of a logical '0' (i.e. only noise in the antenna input of tag) can sometimes result in a significant pulse being generated in the super-regenerative oscillator of the tag. Since preferably no buffer amplifier is used between the oscillator and antenna, the reflection signal may subsequently be transmitted by the antenna.

The estimated ratio between the peak values of '1' i.e. an intentional incoming transmission pulse being detected, and '0' i.e. only noise being detected can in some cases be approximately 5-10. Consequently the peak value of the generated pulse should be 5-10 times larger when '1' than when '0'. In a super-regenerative receiver the difference between a received '1' and a received '0' can be acquired by observing the resulting amplitude of the oscillation at the output of a simple envelope detector. As described above, the most important point of reception timing is the zero-crossing of the oscillator damping factor controlled by the quench signal. If there is an incoming RF pulse during the zero-crossing the detection result should be '1'. Otherwise the detected value should be '0'.

Since no buffer amplifier is used between the oscillator and antenna in order to allow reflection of pulses from the tag, and to minimize power consumption of the tag, the detection of zeros can generate a pulse in the oscillator which is also transmitted from the antenna of the tag. A ghost pulse may also be transmitted from the reader in response to the initial ghost pulse. These unintentional signals transmitted as a consequence of the detection of incoming 'zeros' are referred to hereafter as ghost pulses.

Figure 20:
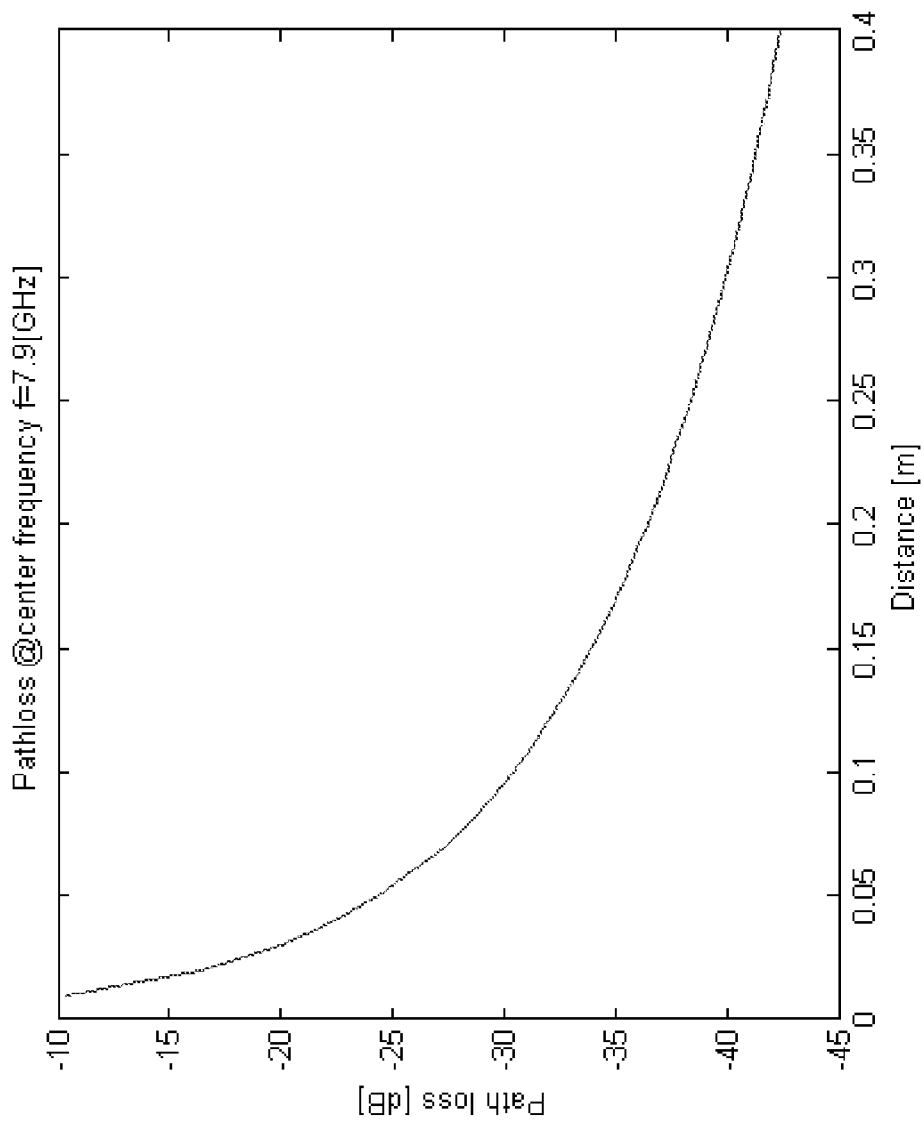
FIG. 20 is a graphical representation of path loss as a function of distance between transceivers at a frequency of 7.9 GHz.

A potential problem of such ghost pulses is that it may be difficult for the tag to distinguish a ghost pulse emitted by the reader from an intentional pulse with the value '1' transmitted by the reader. The reason is that due to free-space pathloss the attenuation even within a 30 cm range varies significantly (for example, by about 30 dB between 2-30 cm at 7.9 GHz which is targeted in short range RFID communication) as illustrated in FIG. 20. The estimated amplitude ratio between the detection of a '0' (noise) and of a '1' (intentional transmitted pulse) is strongly depends on signal to noise and interferences ratio that could be in some cases less than amplitude variation due to varying pathloss. As a result, the amplitudes of two different pulses received by the tag may be the same although the purpose of them is totally different: for example one pulse may be transmitted as an intentional transmission pulse from the reader (when distance between devices is greater e.g. 30 cm) and another pulse may be an unintentionally transmitted ghost pulse from the reader (when the distance between the devices is shorter e.g. 10 cm).

The embodiments described hereafter are designed to minimize any potential drawbacks caused by the ghost pulses.

Figure 21A:
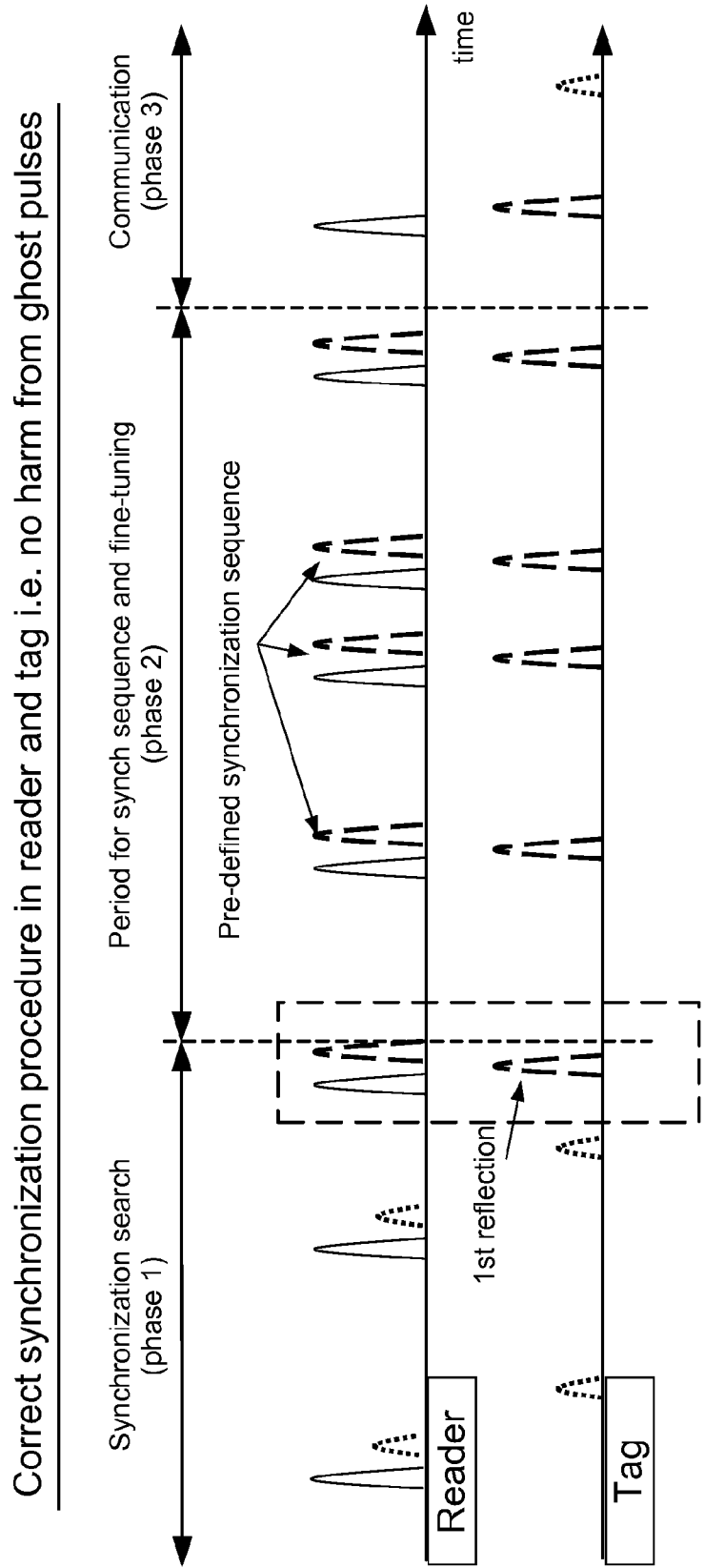
FIG. 21A is a schematic illustration of a phase synchronisation procedure according to an embodiment of the invention in which ghost pulses do not affect the correct synchronisation.

An exemplary overall synchronization scheme comprising three phases (synchronisation search, synchronisation sequence and fine tuning, and communication) according to at least one embodiment of the invention is illustrated in FIG. 21A. The uppermost timeline presents the signals of the reader and the lowermost timeline presents the signals of the tag. In this case the first match of pulses transmitted (in the dashed box) by a reader and reflected by a tag is successfully used to detect and initiate synchronized communication between the devices. An enlarged diagram illustrating the timing of pulses during the first reflection is presented in FIG. 21B. The uppermost timeline presents the signals of the reader, the middle timeline presents the signals of the tag and the bottommost time line represents the data duty cycle. Since the first match of pulses is correctly aligned in time, no negative effects of ghost pulses are experienced.

Figure 22A:
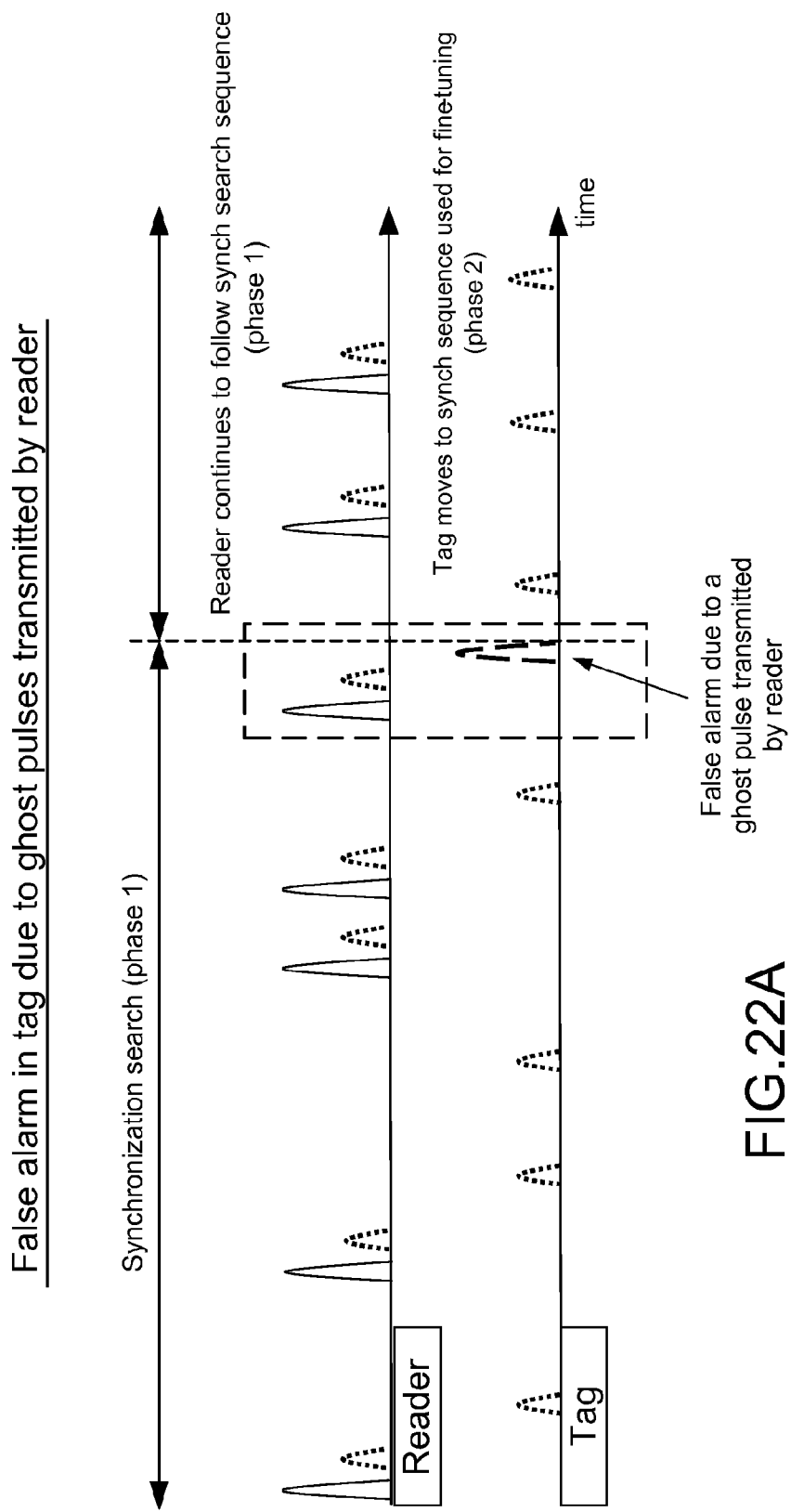
FIG. 22A is a schematic illustration of a phase synchronisation procedure according to an embodiment of the invention in which the ghost pulse generated by the reader entails a false alarm at tag side.
Figure 22B:
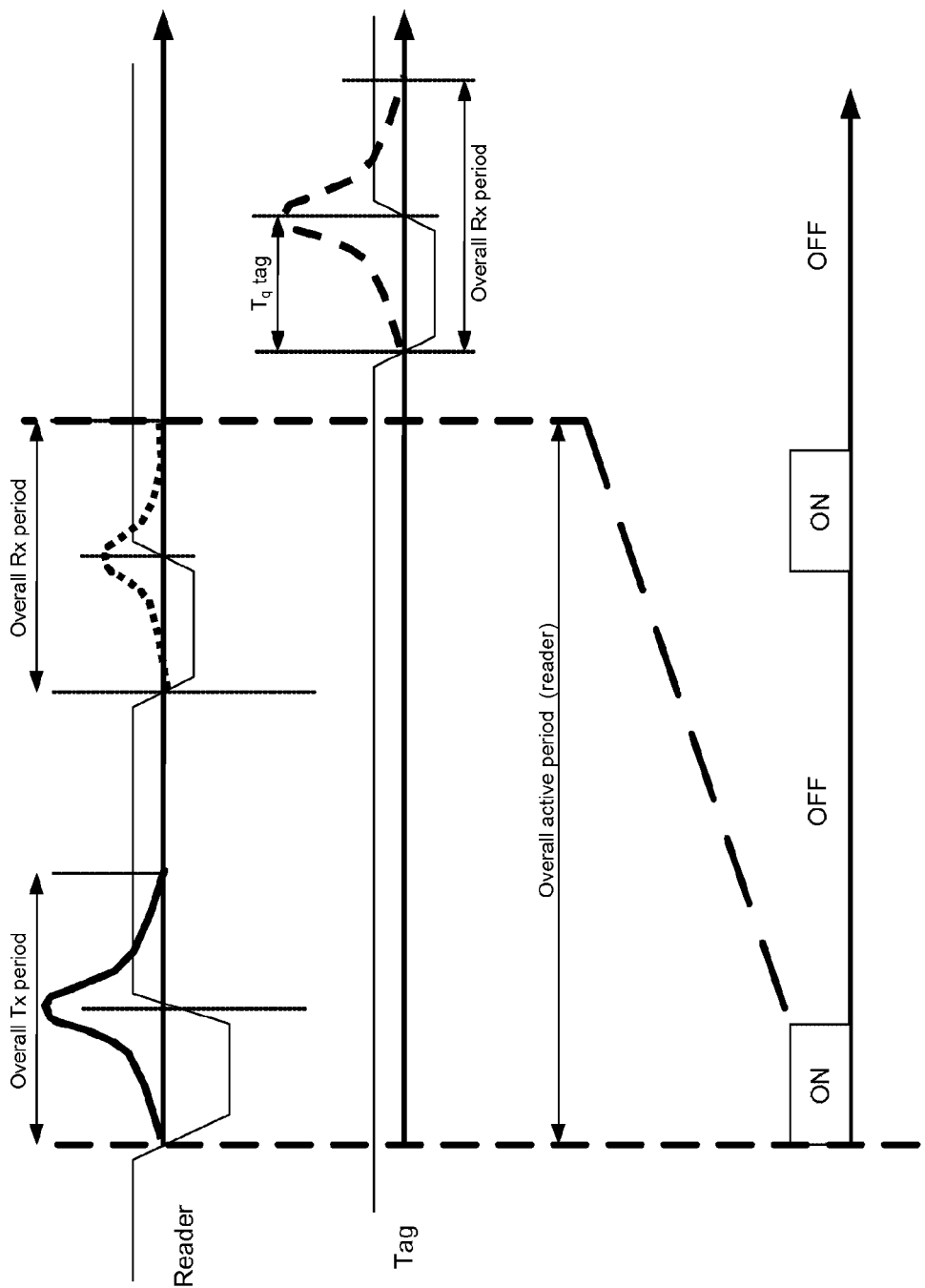
FIG. 22B is an enlarged illustration of FIG. 22A displaying the timing of transmission and reflection signals in the tag and the reader.

FIG. 22A illustrates a situation where a false alarm of synchronization occurs in the tag. An enlarged description of the dashed box is presented in FIG. 22B. The first pulse on the reader timeline in FIG. 22B is the actual pulse with value '1' which is transmitted by the reader. Similarly to FIG. 21B the transmitted pulse is followed by a detection period in the reader during which a detection pulse in the reader is generated. Since there is no reflection signal from any tag to the first intentional transmission pulse, the oscillation in the reader does not exceed the detection threshold defined for indicating an incoming '1' pulse. However, the resulting oscillation is seen as a ghost pulse subsequently transmitted by the reader and then detected by the tag since the transmission of the ghost pulse (from the reader) occurs at the correct time with regard to the detection time of the tag (no prior synchronization between the devices has been achieved). Although the ghost pulse is of a lower amplitude than an intentional transmission pulse with value '1', due to path-loss variation resulting from varying distance between mobile devices, a false alarm occurs. A potential problem would be that the tag continues to phase 2 in the synchronization procedure (or to initiate a data transfer) since it detected an incoming ghost pulse as an erroneous acknowledgement from the reader. The reader, on the contrary will not do any state transitions since it did not detect any RF pulse during its detection period.

The simplest way of avoiding transmission of unintentional pulses according to prior art methods would be to use an LNA in the receiver to act as a buffer between the oscillator and antenna. However, the LNA would also prevent the transmission of reflection signals when an incoming '1' is received. One possibility is to use dedicated paths for Tx and Rx signals, but this can make the transceiver more complex and increases power consumption. Non-existence of the buffering LNA is one of the main aspects of the embodiments of the invention which allows the reflection of pulses and the utilization of reflection advantageously in the phase synchronization and communication. Therefore, alternative solutions to buffering amplifiers must be considered to overcome any potential problems caused by the ghost pulses especially in the case of RFID applications targeting for ultra low-power system.

Accordingly, a further embodiment of the invention will be described with reference to FIGS. 23A to 23D and 24. According to the method of the further embodiment there may be three different detection alternatives at the tag during the synchronization search phase 1, as described for previous embodiments. Each of the alternatives are presented in FIG. 23A.

Figure 23A:
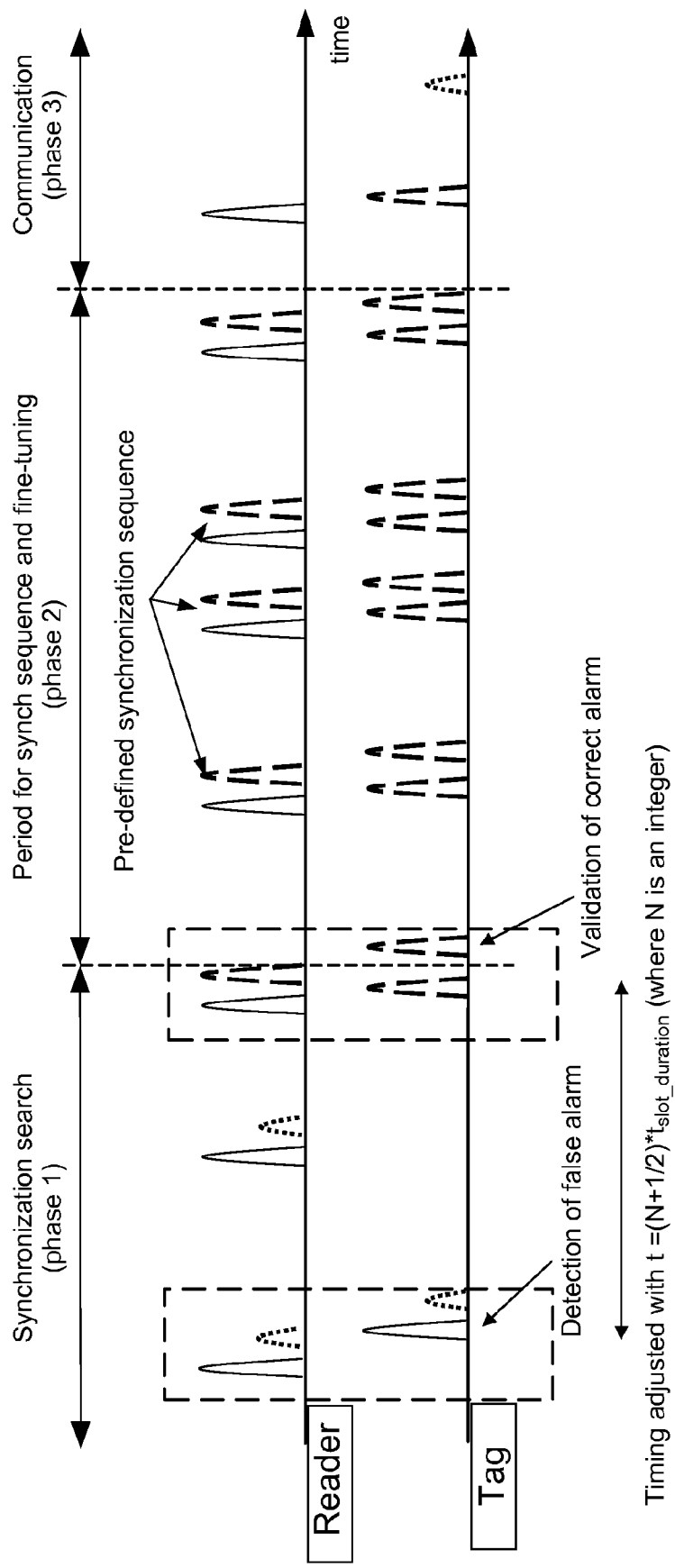
FIG. 23A is a schematic illustration of a phase synchronisation procedure according to a further embodiment of the invention highlighting the dual detection method at tag side.

The first signal generated in the tag results from noise at the tag antenna input and not from an incoming transmission pulse received from the reader (signal within the dashed circle of FIG. 23A). This means that no match with the pulse sequence from the initiator, in this case the reader, is found. The detection (SD3) of no incoming intentional signal (i.e. detection of zero) does not cause any further detection actions in the tag. Both the tag and the reader, however, continue the low duty-cycle detection sequence (SD2), normally according to its predefined time-hopping scheme.

Figure 23B:
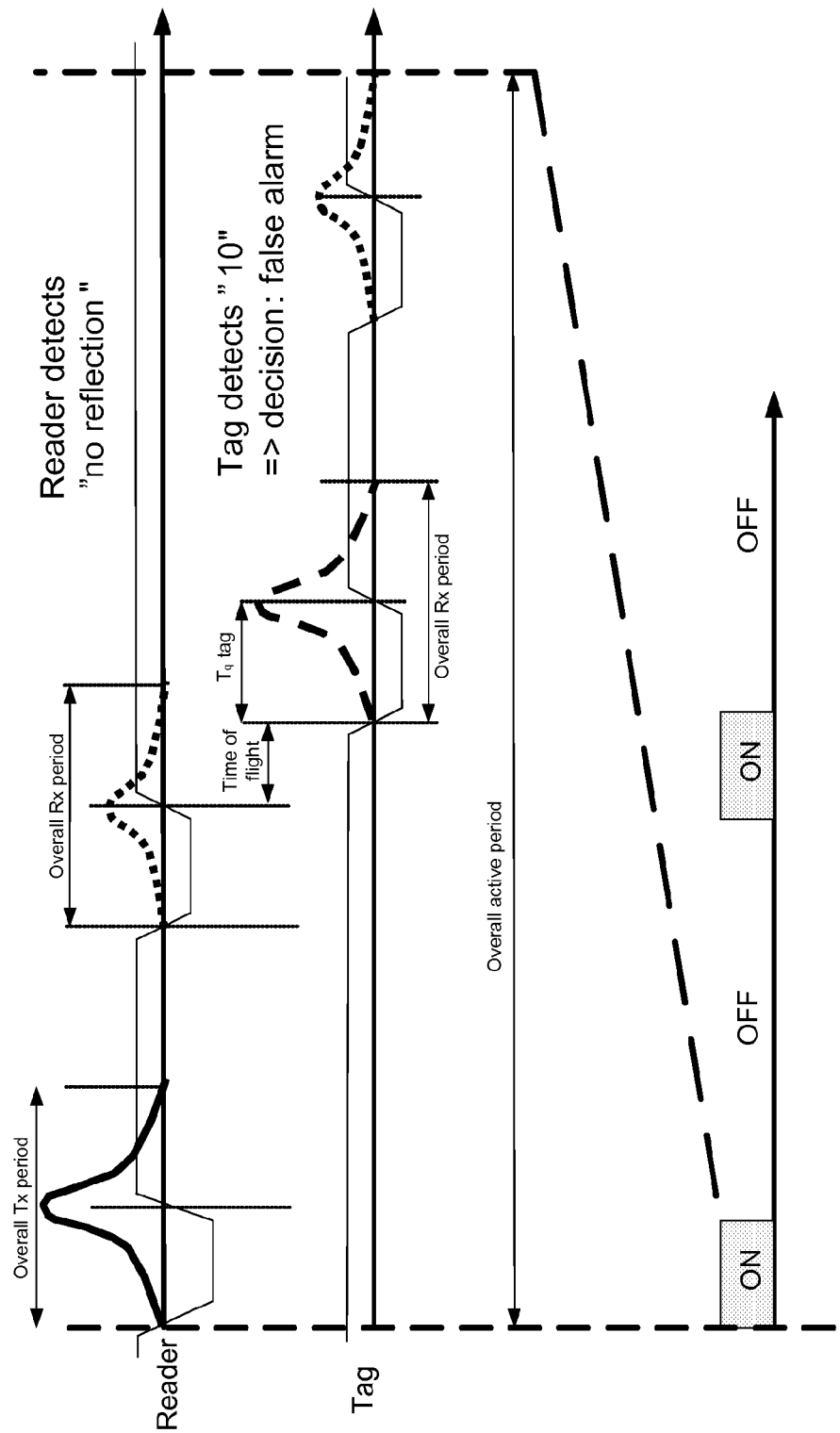
FIG. 23B is an enlarged illustration of FIG. 23A displaying the timing of transmission and reflection signals in the tag and the reader when a false alarm due to a ghost pulse is detected/avoided with the dual detection method.

The next signal generated in the tag as illustrated on the tag time line of FIG. 23A has a greater amplitude and is detected in the tag (signal within leftmost dashed box). The generation of this signal is, however, caused by a ghost pulse transmitted by the reader. Due to variation in pathloss the tag cannot determine if the incoming pulse is actually an intentional transmission pulse from the reader of a ghost pulse originating from the detection period of reader (or from other interference). FIG. 23B presents this scenario in more detail. According to the proposed further embodiment, the first detection period (SD3) in the tag is followed by an additional detection period (SD4). This additional detection period might be activated only if the first detected bit is '1'. This is referred to as "conditional" dual-detection since no dual-detection is done i.e. the second detection period is omitted, when the first detection is '0'. As illustrated in FIG. 23B there are no incoming pulses received at the tag during the latter detection period and the overall detection result is then "10". From this result the tag may conclude that the first pulse was a false alarm and as a consequence remains in the synchronization phase 1 (SD1).

As an additional improvement to the system, the tag may fine-tune its detection timing (SD7) by advancing the timing by a period corresponding to the pulse separation of the Tx and Rx periods (of the reader). An identified detection of a ghost pulse may be used as input for the adjustment. By doing this it becomes more probable that the next match with a pulse coming from the reader is the actual pulse transmitted with amplitude of '1' and not a ghost pulse. This is because the reader requires equally long time periods for transmission and reception of pulses and if the tag first detects a ghost pulse resulting from a detection at the reader, it is advantageous to advance the timing of next detection in the tag by the time period which is equal to the gap between Tx (transmission) and Rx (reception) periods of the reader. In practice, the reader transmits pulses according to a pseudo-random time-hopping sequence and the time between consecutive Tx pulses is then a random integer times the duration of a slot (since impulse UWB frames are divided into slots). If the first pulse detected by the tag is a ghost pulse related to the Rx period of reader, by advancing the timing (in the tag) by half of the slot duration (SD7), the probability of detecting the correct pulse ('1' from reader) during a subsequent match of synchronization sequences is increased.

Figure 23C:
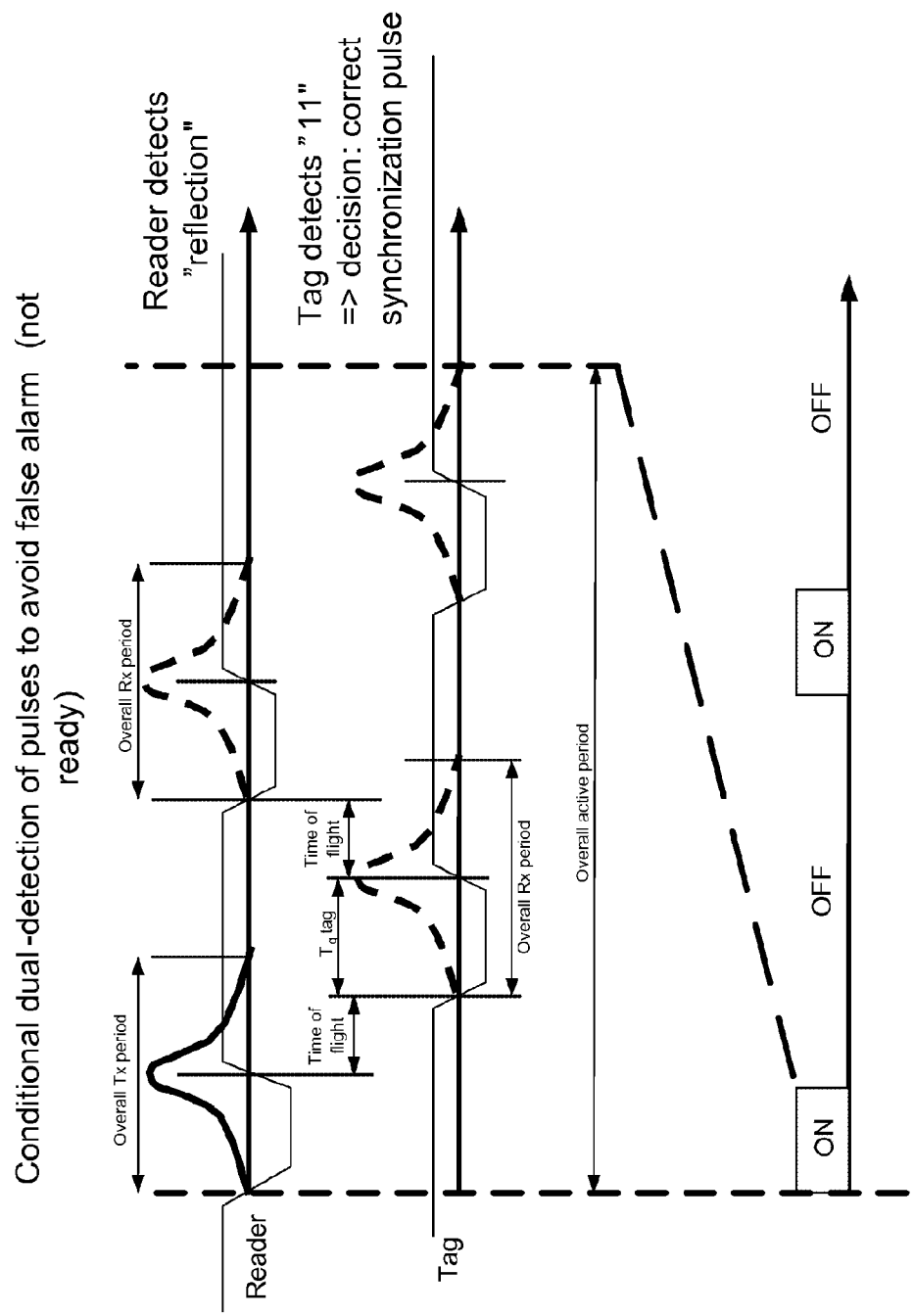
FIG. 23C is an enlarged illustration of FIG. 23A displaying the timing of transmission and reflection signals in the tag and the reader when a transmission pulse is detected with the dual detection method.
Figure 23D:
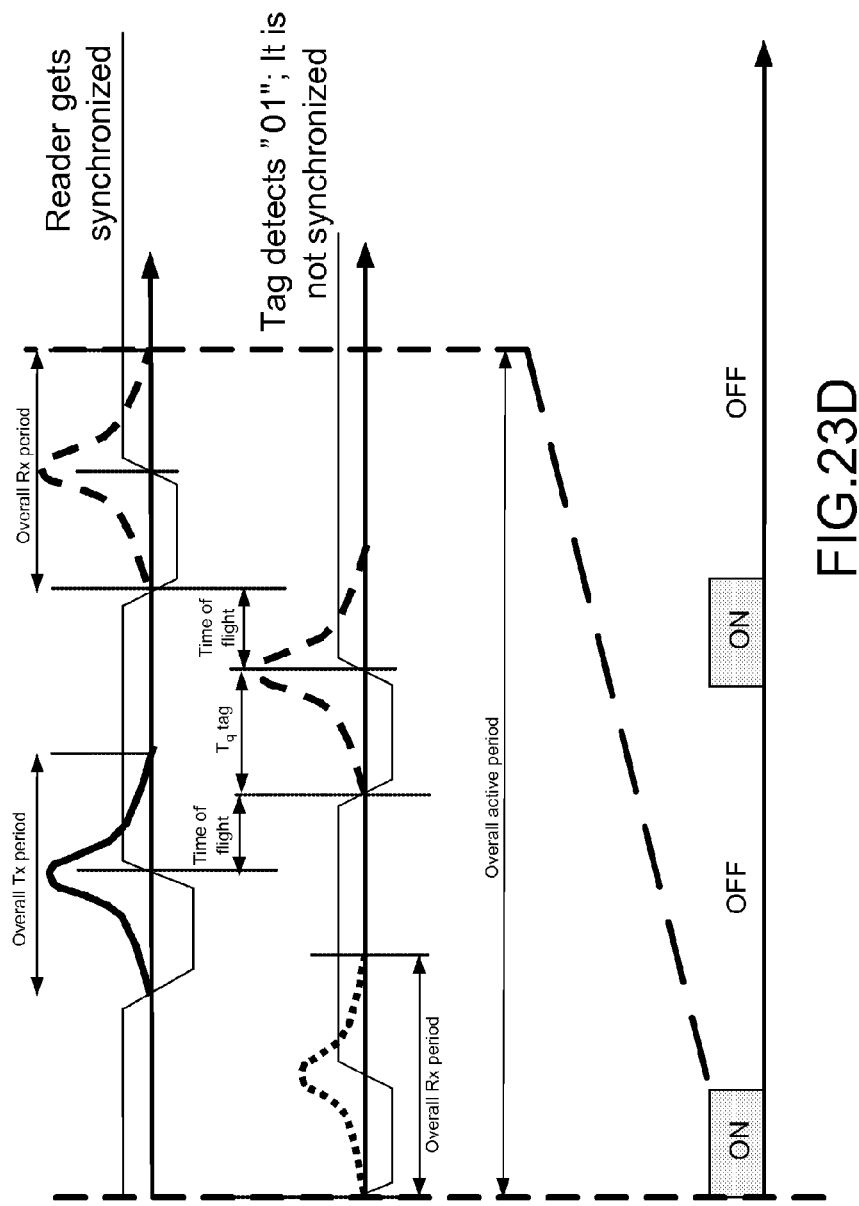
FIG. 23D is an enlarged illustration of FIG. 23A displaying the timing of transmission and reflection signals in the tag and the reader when the ghost pulse due to 'not'-conditional dual-detection is generated by the tag and may entail a false alarm at reader side.

As presented in FIG. 23A the subsequent detection period in the tag results as "11" (the second dashed box). The scenario is presented in more detail FIG. 23C. It may of course be possible that there are multiple detections of zeros in the tag between a "10" detection and a "11" detection. In FIG. 23C the first detection of a '1' at the tag (SD3) is caused by an intended transmission pulse transmitted by the reader. However, as mentioned previously this is not obvious to the tag due to varying distance between the mobile devices. An additional detection (SD4) is therefore needed in the tag to determine whether the incoming pulse is an intentionally transmitted pulse from the reader. In this case the latter detection (SD4) also results as '1' which means that the first pulse was not a ghost pulse. According to the method of this embodiment, as a consequence of detection of "11" in the tag, the tag continues to phase 2 of the synchronization procedure (SD6) (phase synchronisation verification phase) as described for previous embodiments. The dual-detection can be used during phase 2 if necessary until the verification and fine-tuning period is completed. From the reader's perspective the procedure is similar to the method of the previous embodiments. If a reflection signal is received from a tag at the correct moment in time, the reflection signal is detected by the reader and it may continue to synchronization phase 2 as described above.

Figure 24:
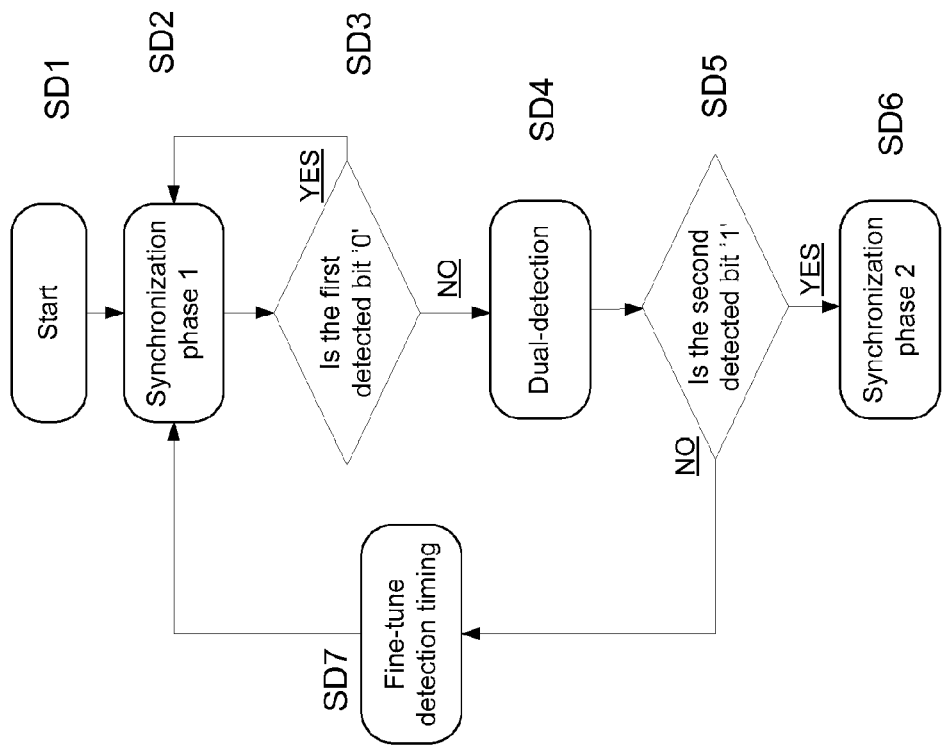
FIG. 24 is a flow chart illustrating a method of phase synchronisation between a tag and a reader according to the further embodiment of the invention.

As presented in FIG. 24 it is only necessary to use dual-detection (SD4) in the tag if the first detection (SD3) results in a '1'. In phase 1 it is not necessary to have two detection periods in the tag if the first detection results in a '0'. In addition, it is not necessary to use dual-detection in the tag during synchronized communication in phase 3.

An alternative embodiment of the synchronisation method will now be described with reference to FIG. 25. The key improvement provided by this alternative embodiment is that instead of transmitting single impulses during the synchronization phases 1 and 2, the reader transmits a sequence (or burst) of impulses using a pre-determined bit pattern. The bit pattern should contain at least one zero so that problems related to unwanted reflections from reader (the "ghost pulses") can be avoided. For illustrative purposes a description of how this method works when a simple three-bit pattern '101' is used in the phase synchronization procedure will be presented. It will be understood that alternative bit patterns may be used.

Figure 25:
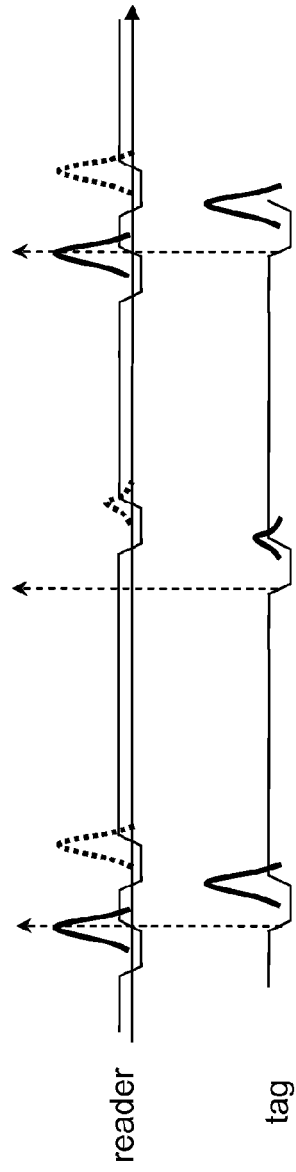
FIG. 25 is a graphical illustration of a method of phase synchronisation according to an even further embodiment of the invention with multiple pulses sequence.
Figure 25:
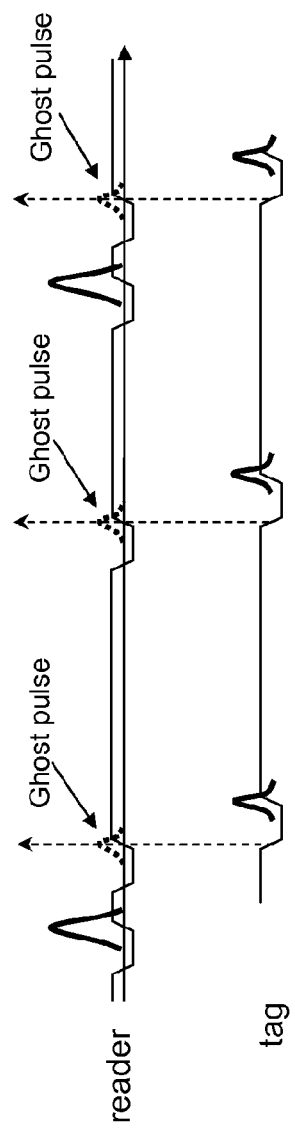

FIG. 25 illustrates an example where the reader transmits a bit pattern '101' when trying to obtain phase synchronization with the tag. At the reader side, the impulses defined by solid lines are representative of '1' signals transmitted by the reader. The impulses drawn in dotted lines represent the impulses that are received by the reader. At the tag side, the impulses drawn in solid lines represent the signal received by the tag. Note that when there is a zero in the synchronisation bit pattern, the reader should not actually transmit anything but only listen for possible reflection signals from the tag. The receiver at the tag side is activated using same timing pattern as in the reader side.

FIG. 25(i) illustrates an optimal case, where the reader and tag are in the same phase. In this case, the bit pattern received by the tag matches the known synchronization pattern ('101' in this example), which indicates that phase synchronization is found. When the reader and tag are at the same phase, the bit pattern received by tag is reflected back to the reader in a similar manner to the sending of reflection signals in previous embodiments. In this way the reader is able to detect that phase synchronization has reached.

FIG. 25(ii) represents the case where the tag and the reader are out of phase such that the tag timing is slightly behind the reader and the tag reception slots are coincident with the unwanted ghost pulses generated by the reader. If reflection of only one single pulse was used as the decision criteria when moving from phase 1 to 2 potential false alarms in the synchronization procedure may be created. However, as shown in FIG. 25(ii) the bit pattern received by the tag is '111' (and '000' by the reader), which does not match the sync pattern '101'. Therefore the tag (and reader) are able to detect that phase synchronization has not yet been reached and the risk of potential false alarms is thereby eliminated.

It will be understood that several variations of the embodiment described above are possible. To further increase robustness of the phase synchronization procedure, for example, it is possible to use longer bit sequences. Moreover, the selection of the bit patterns (in other words, the location of 'zeros') can be varied in order to fine-tune the sync procedure. The devices may also dynamically fine-tune the length of trans-mitted/detected bit patterns depending on the detected impulses.

The idle period between transmissions of consecutive transmitted synchronisation patterns can in principle be selected arbitrarily. However, to guarantee that the transmitted RF spectrum is within regulatory limits, it may be necessary that the bursts do not occur at even intervals but the spacing between the bursts follows some (pseudo) random timing pattern which is a widely used method in impulse UWB communication. To further tune the radiated RF spectrum, it is possible to adjust the timing of pulses within a synchronisation pattern. The pulses within one pattern do not have to be evenly spaced in time. For example, in case of the exemplary 3-pulse sequence discussed above the time between the first and second pulses may differ from the time between second and third pulses.

The main advantage of the synchronization procedure according to this embodiment compared to the previous embodiments is that the use of a multi-bit sync pattern makes the detection of synchronization more reliable. When the transition from sync search (phase 1) to the fine tuning (phase 2) is made, there is more data available to support the decision making and the probability of a false alarm is lower. The synchronisation pattern that is reflected from the tag can also be utilized to gain additional information about the RF link between the reader and the tag. For example, the amplitude levels of '1' and '0' symbols can be observed by the reader (the sync pattern includes at least one '0' symbol) and this information can be used to automatically adjust the threshold between '1' and '0' in the reader's receiver.

An even further embodiment of the invention will be described with reference to FIGS. 26 to 27. The method of phase synchronisation according to this embodiment of the invention will be referred to as mutual backscattering synchronisation. The term mutual synchronization in this context means that the phase synchronization of communication devices includes switching of roles between the functions of initiation and response. In the methods described previously, the initiator always detects for reflections. However, to improve the robustness of a synchronization method based on reflection of pulses, it can be beneficial that the responder/tag device also initiates pulses and detects reflections for the initiated pulses. The term backscattering in this context means that the acknowledge pulse (response to an incoming pulse) is directly backscattered by the responder to the interrogator.

In the first phase of synchronization procedure according to this embodiment, the first device (for example, a reader) operates as the initiator for the communication between the two devices, and if a signal potentially indicating synchronization is detected, the other end of the system (for example, a tag) verifies the synchronization by repeating the function of initiator in the opposite direction after a predefined time interval $t_{val}$. In other words, the role of initiator is temporarily switched to verify that the detection result was correct and to avoid any problem which may be caused by false alarms. If the result of the verification state is not correct, the device unintentionally changing to synchronization phase 2 may return to the phase 1 immediately.

The principle of mutual synchronization based on backscattering of pulses is described with reference to FIG. 26. During the synchronization phase 1 there are potentially three functional alternatives in the tag which are each represented in FIG. 26. The last signal transmitted in phase 1 results in a correct transition from synchronization phase 1 to phase 2. Exemplary state-diagrams of a tag and a reader operating according to this embodiment are presented in FIG. 27. At the start of synchronization phase 1, the reader and tag operate similarly to the embodiments previously described. The reader transmits an initiation transmission pulse SR2 and detects a for reflection signal SR3 after transmission of the transmission pulse. The tag detects for incoming pulses from the reader ST2, ST3 according to a pre-defined time-hopping scheme.

Figure 26:
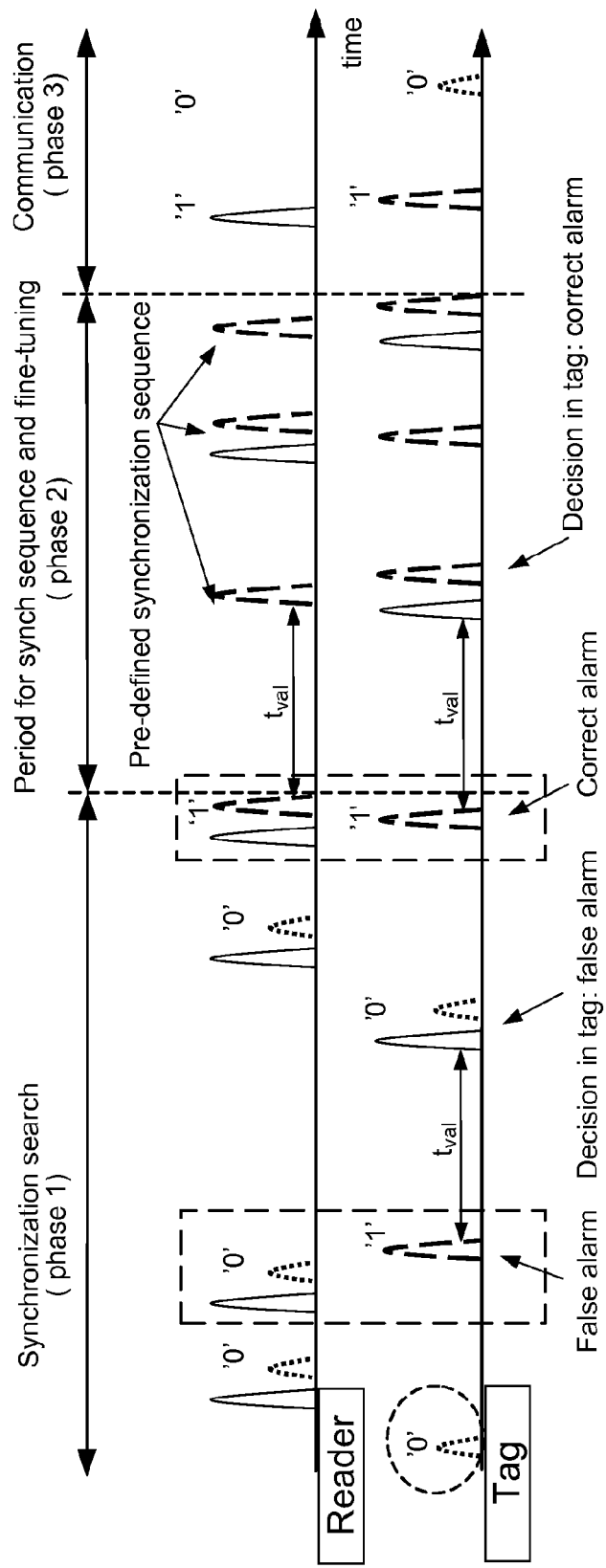
FIG. 26 is a graphical illustration of a method of phase synchronisation according to yet an even further embodiment of the invention based on mutual detection method using backscattering.
Figure 27:
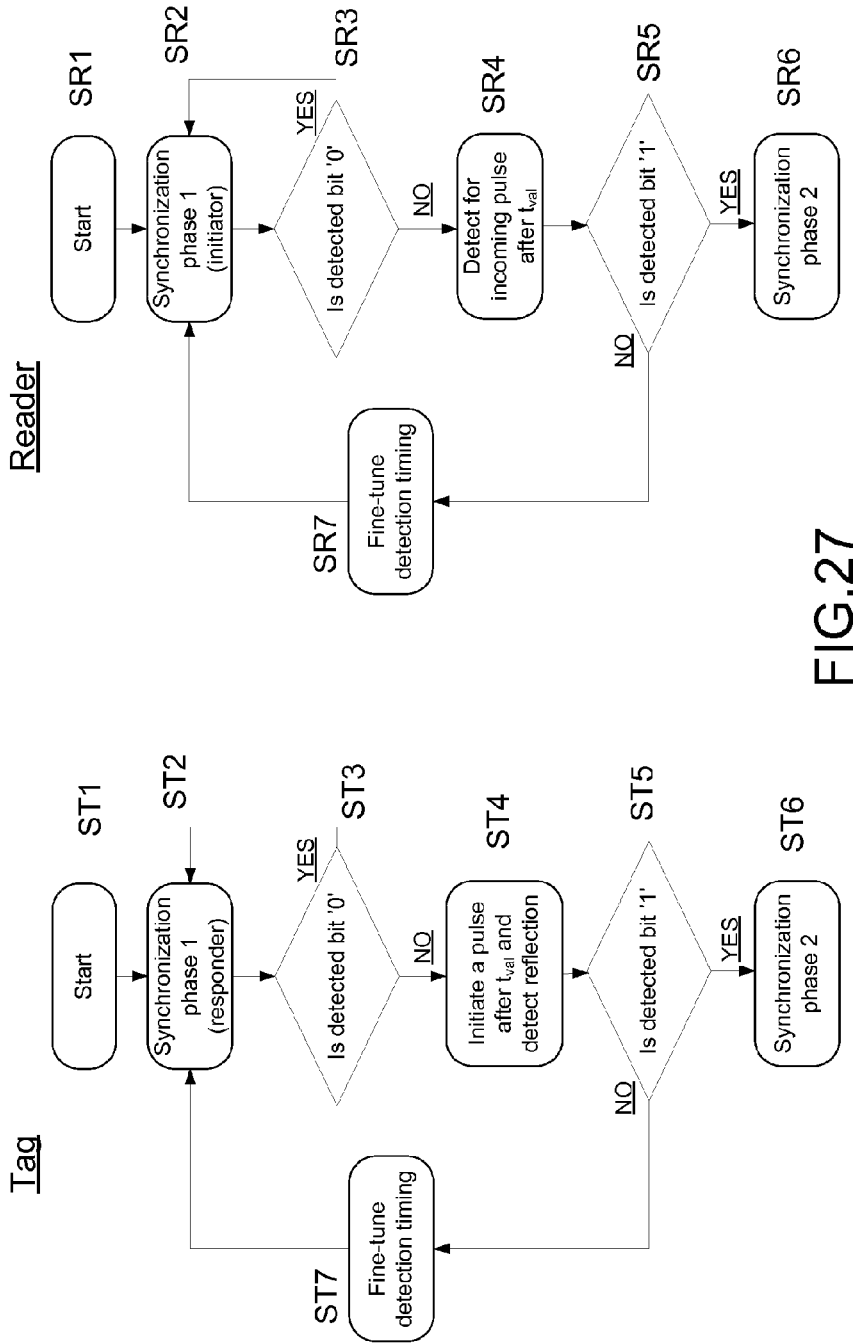
FIG. 27 is a flow chart illustrating the method of phase synchronisation in (i) a tag and (ii) a reader in the mutual detection method using backscattering.

In FIG. 26 the first detection due to noise in the tag results as zero (dashed circle). The detection of zero does not cause any state transitions in the tag but both the tag and the reader continue the detection according to its predefined time-hopping scheme (ST2, SR2).

The second signal detected at the tag results in a '1' which is presented in the leftmost dashed box in FIG. 26. The detection result '1' is caused by the ghost pulse transmitted by the reader device. However, to make the decision-making between correct and false alarm simple, the tag transfers to the initiator state and transmits a pulse after a known time-period tval ST4. Correspondingly, the reader switches from initiator state to responder state if it detected '1' after an initiation pulse SR3. If the pulse detected by the tag had been a correct synchronization pulse from the reader, the reader would detect the first reflection as '1' and would have responded to the initiation pulse transmitted by the tag after tval SR4. However, since the tag in this case detected a ghost pulse the reader consequently detects '0' SR5 (i.e. no synchronization pulse from the tag) no state transitions occurred in the reader, and as a result the tag gets no response to its initiation pulse i.e. the tag detects '0' and returns to synchronization phase 1 SR1. Similarly to the previous embodiment the reader and tag may go through a process of fine tuning ST7, SR7

The correct match in timing of pulses is presented in the rightmost dashed box of FIG. 26. In this case both the reader and the tag detect '1' correctly as a result of a "real" reflection ST3, SR3. To ensure that the detection result is correct, a role switch from initiator to responder (in the reader) and vice versa (in the tag) is performed ST4, SR4. To simplify hardware implementation, a pre-defined time-period tval defines the timing of the next reflection. As already explained above, after time period tval the tag operates as the initiator (transmitting an initiation pulse and detecting for a reflection signal) and the reader operates as the responder (only detects for incoming initiation pulses). If the detection result in both devices is '1', both ends of the system may be sure with increased probability that the first detected pulse was correct.

It will be understood that the number of reflections in different roles may be greater than one to increase the probability of correct synchronization before transition to phase 3 (communication state). In the example presented in FIG. 26 two reflections in both initiator-responder combinations are performed before the final transition to communication phase 3 (resulting in a total of 4 reflections) where exemplary communication is done by using On-Off-Keying (OOK).

The main benefit of the embodiment described here is the relaxed timing requirement in comparison with the conditional dual detection embodiment previously described. The duration of tval may, for example, be one frame or more in terms of an impulse UWB time-hopping scheme. The power level of the tag may also be taken into account in the selection of tval since the operation as the initiator consumes slightly more power than only detection of incoming pulses. The trade-offs between desired acquisition time and requirements set for the performance of transceivers can be used flexibly to find the most suitable value for tval. The main requirement for the selection of tval is that the same time period should not occur too often in the time-hopping schemes of other operational states (like synchronization phase 1). The non-existence of tval in other time-hopping sequences would minimize the probability of consecutive false alarms which increase the overall acquisition time.

A more general embodiment of the method described above will now be described with reference to FIGS. 28A to 28C. Each of the embodiments described above assumes that the transceiver structure transmits almost immediately reflection signals as a response to initiation pulses transmitted by the reader device. In the embodiment described here the transceiver may also be a higher quality transceiver which does not transmit any immediate ghost pulses during detection but utilizes "delayed reflection" to find synchronization.

The embodiment presented here does not necessarily exploit the inherent reflection of super-regenerative receiver which has been previously described. In the reception state unintentional transmission of a signal from the super-regenerative oscillator may be avoided by using a buffering amplifier such as an LNA. In other words, with high quality transceivers there are less problems related to the ghost pulses but efficient phase synchronization of the transceivers may still be a challenge. According to the present embodiment an acknowledgment is generated only if a pulse has been detected and the acknowledgement is generated after a pre-defined delay. When using super-regenerative transceiver architecture this can be achieved by applying a generative pulse after a re-generative pulse has indicated an incoming pulse.

Based on this principle a general mutual-synchronization sequencing is proposed: (1) first the reader generates a transmission pulse and after a predefined time window it listens for an acknowledgement from a tag in the field. The tag listens for an incoming pulse in the field, and if and only if a pulse is detected it generates an acknowledgment after a predefined delay; (2) after the first sequence is achieved, both the reader and the tag start a second sequence comparable with the role switch introduced in the previous embodiment in which the tag generates a transmission pulse and listens for an acknowledgment from the reader. The reader listens for an incoming transmission pulse from the tag and sends back an acknowledgment. The time at which phase-2 pulses are generated are predefined.

Figure 28A:
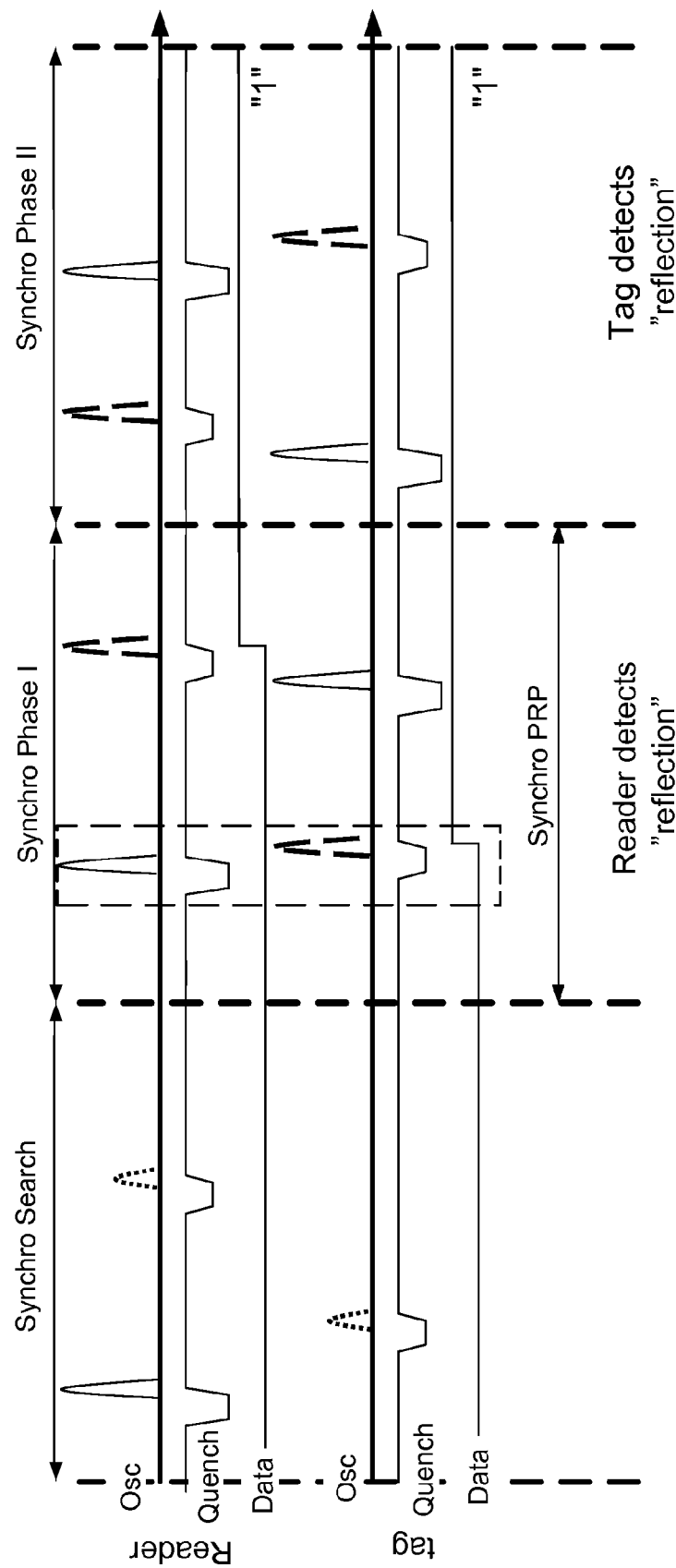
FIG. 28A is a graphical illustration of the method of phase synchronisation based on generalisation of the mutual detection method when there is no false alarm.
Figure 28B:
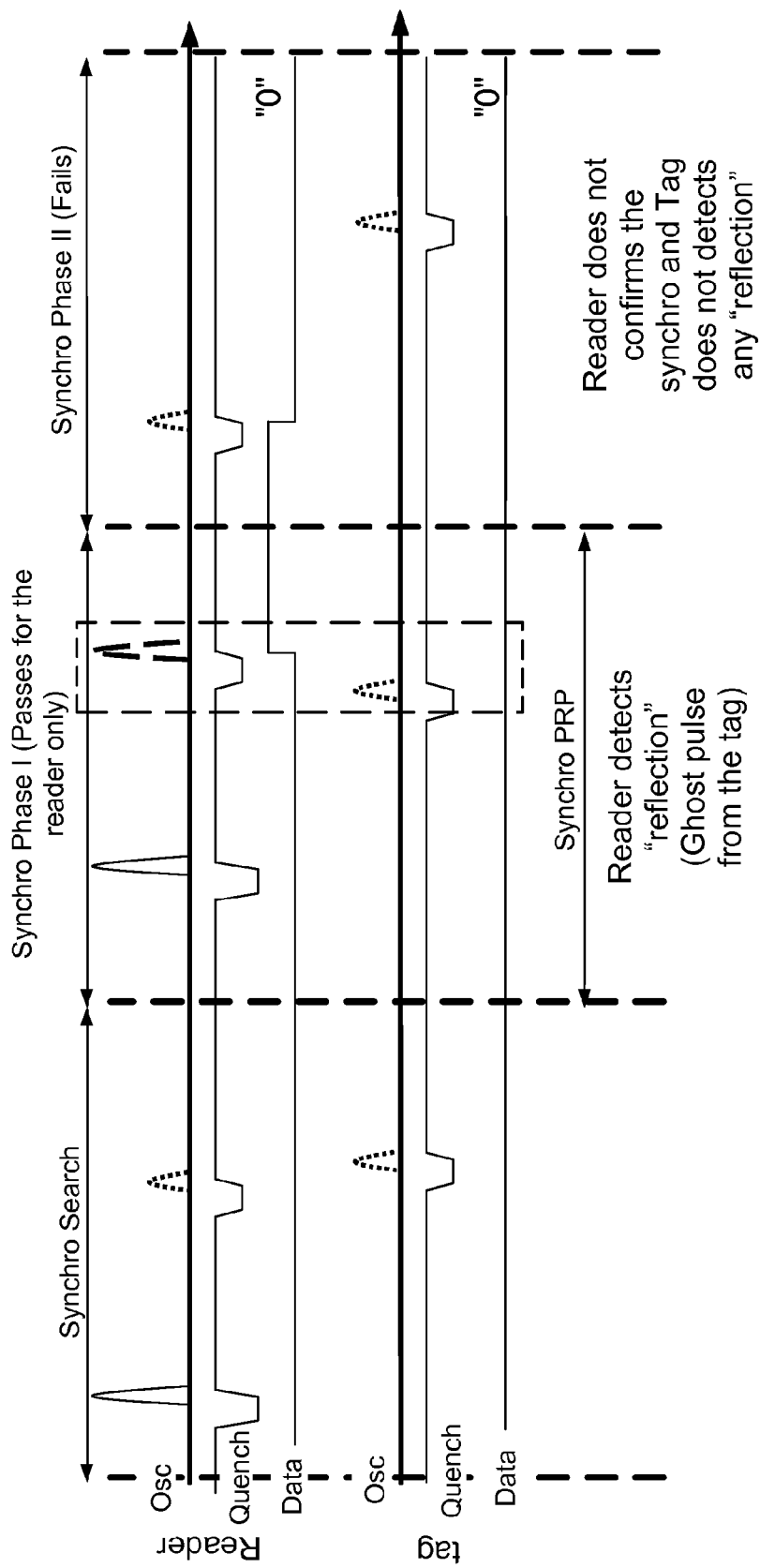
FIG. 28B is a graphical illustration of the method of phase synchronisation based on generalisation of the mutual detection method when there is a false alarm which can be detected by the system.
Figure 28C:
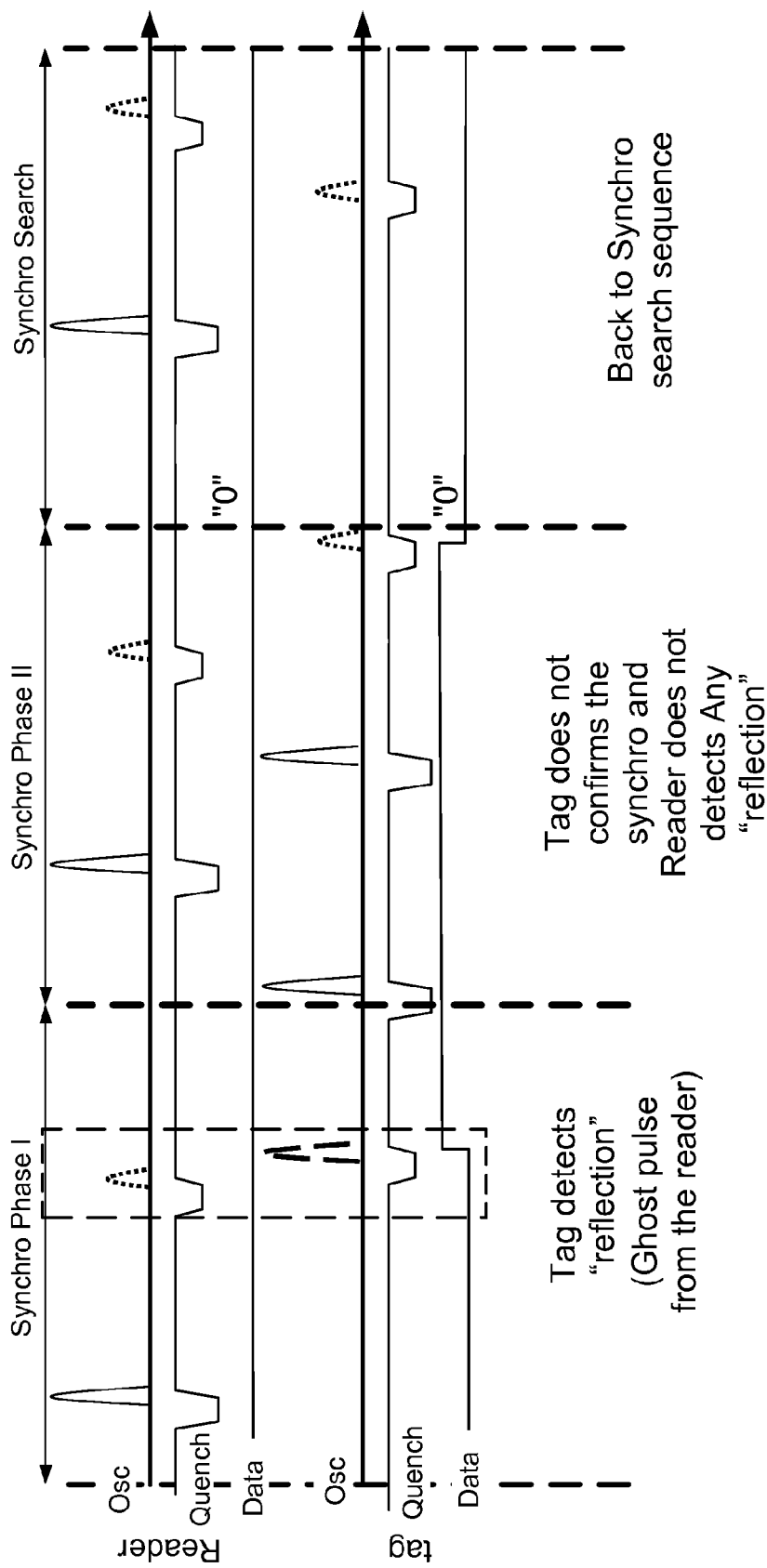
FIG. 28C is a graphical illustration of the method of phase synchronisation based on generalisation of the mutual detection method when there is an alternative false alarm which can be detected by the system.

An example of this 2-phase synchronization sequencing is illustrated in FIG. 28A. "Osc", "Quench" and "Data" plots refer respectively to oscillations peak envelop, quench signal (or any receiver/emitter activation signal in case of non super-regenerative architecture) and the logic states detected by the circuitry. In the case where transceivers generating no ghost pulses are used the pulses represented by dashed lines can be omitted. According to the oscillation peak envelop amplitude, a logic signal is generated and sampled on each falling edge of any re-generative quench signal. The result is the Data signal. The Data signal characterizes the synchronization status of the transceiver (synchronized or non-synchronized). The proposed sequencing ensures that after the 2-phases synchronization process is achieved, both reader and tag are synchronized (Data='1' in the reader and in the tag), or both are non-synchronized (Data='0' in the reader and in the tag). FIG. 28B and FIG. 28C illustrate the sequencing in case of ghost pulse detection which is possible if low-cost transceivers without buffer amplifiers are used. Timing between generative and re-generative pulses and also timing between phases I and II should be defined in a proper way to guarantee a good rejection of false alarms.

One can consider that mutual synchronization sequencing described in this embodiment is also an extension of the multi-bit sync pattern embodiment described previously.

One drawback related to the generalized mutual-synchronization or "delayed reflection" of the present embodiment is the increased number of pulses in the synchronization phase which may increase interference level. If the method is compared with the previous embodiment in the case of transceivers which generate ghost pulses, the overall number of pulses generated for one reflection is four in the present embodiment compared to three of the previous embodiment.

However, as mentioned, the generalized mutual-synchronization method according to this embodiment can also be used in phase synchronization of impulse UWB transceivers which do not generate ghost pulses during detection. In such a case the generalized mutual-synchronization can be used to relax timing requirements of the transceivers.

The main advantage provided by embodiments of the invention is the possibility of improving some of the drawbacks of low-cost super-regenerative transceivers existing on physical layer L1 on protocol layer (L2) of the system. The proposed embodiments improve the usability of the novel synchronization method which is seen as a promising solution for ultra low-power (impulse radio based) UWB RFID systems targeting for high data-rates.

The invention claimed is:

1. A method for synchronizing active transmission and reception timeslots of transceivers, comprising:
   transmitting a transmission pulse signal from a first transceiver to a second transceiver;
   transmitting a reflection signal from the second transceiver to the first transceiver in response to the transmission pulse signal if the transmission pulse signal is received at the second transceiver within an active reception timeslot of the second transceiver and using timing information of a time of activation of the active reception timeslot by the second transceiver during which the transmission pulse signal has been received to establish active reception timeslots of the second transceiver for future communication; and
   detecting the reflection signal with the first transceiver and using timing information of a time of transmission of the transmission pulse signal to establish active transmission timeslots of the first transceiver for future communication.

2. The method according to claim 1 wherein a super-regenerative oscillator is used by the second transceiver to detect the transmission pulse signal during the active reception timeslot or to generate the reflection signal.

3. The method according to claim 2 wherein the detection of the transmission pulse signal and the generation of the reflection signal are both made during the active reception timeslot of the second transceiver.

4. The method according to claim 1 wherein a super-regenerative oscillator is used by the first transceiver to generate the transmission pulse during a first time slot or to detect the reflection signal during a third time slot following a second time slot corresponding to the active reception timeslot.

5. The method according to claim 3, wherein, in response to the reflection signal, a detection signal is generated by the super-regenerative oscillator used to detect the reflection signal at the first transceiver; the detection signal being then transmitted from the first transceiver to the second transceiver and the detection signal being received by a super-regenerative oscillator at the second transceiver within a fourth time-slot following the third time-slot.

6. The method according to claim 1 wherein for each super-regenerative oscillator, a quench signal is used to enable build-up of a self-oscillation in the super-regenerative oscillator, and the time-slot for generation or reception of a signal being controlled by the quench signal.

7. The method according to claim 1, wherein a signal is detected when the amplitude of the signal has exceeded a predetermined threshold.

8. The method according to claim 3, wherein the first transceiver transmits a sequence of pulses according to a set bit pattern during a series of time-slots, a transmission pulse being generated by the super-regenerative oscillator during one of the time-slots when a bit "0" or "1" is associated with this time-slot, and no transmission pulse being generated by the super-regenerative oscillator during one of the time-slots when a bit "1" or "0" is associated with this time-slot; the set bit pattern comprising at least one "0" and one "1".

9. The method according to claim 1, wherein the reflection signal is transmitted from the second transceiver to the first transceiver during a transmission time-slot different from the active reception time-slot, both time-slots being separated by a predefined delay.

10. The method according to claim 1, wherein after a predefined time interval (tval) following the active reception time-slot, the method comprising the following steps:
   transmitting a second transmission pulse signal from the second transceiver to the first transceiver;
   transmitting a second reflection signal from the first transceiver to the second transceiver in response to the second transmission pulse signal if the second transmission pulse signal is received at the first transceiver within an active reception timeslot of the first transceiver; and
   detecting the second reflection signal with the second transceiver.

11. The method according to claim 1, wherein the second transceiver is synchronized with the first transceiver if the transmission pulse signal is received at the second transceiver within the active reception timeslot of the second transceiver.

12. The method according to claim 1, wherein the first transceiver is synchronized with the second transceiver if the reflection signal is received at the first transceiver within a predefined reception timeslot.

13. The method according to claim 1 further comprising the steps of
transmitting a sequence of transmission pulse signals from the first transceiver to the second transceiver according to a pre-determined sequence;
transmitting a reflection signal from the second transceiver to the first transceiver in response to at least one of the transmission pulse signals if a transmission pulse signal is received in an active receptive timeslot of the second transceiver; and
detecting at least one reflection signal to determine continued synchronization between the first transceiver and the second transceiver.

14. An apparatus for synchronizing active transmission and reception timeslots of transceivers, comprising:
a receiver configured to receive a pulse signal;
a signal generator configured to generate a reflection signal in response to the received pulse signal if the received pulse signal is received within an active reception timeslot of the receiver and using timing information of a time of activation of the active reception timeslot by the receiver during which the transmission pulse signal has been received for synchronization of the receiver by establishing active reception timeslots of the receiver for future communication; and
a transmitter configured to transmit the reflection signal to a co-operative transceiver.

15. The apparatus according to claim 14 wherein the receiver or the signal generator includes a super-regenerative oscillator.

16. The apparatus according to claim 14 wherein the receiver or the signal generator are directly coupled to an antenna of the apparatus.

17. The apparatus according to claim 14, further comprising a detector configured to detect a second reflection signal transmitted by the receiver.

18. The apparatus according to claim 14 wherein the transceiver includes an RFID reader or an RFID tag.

19. An apparatus for synchronizing active transmission and reception timeslots of transceivers, comprising:
a transmitter configured to transmit a pulse signal;
a receiver configured to receive a reflection signal transmitted by a co-operative transceiver in response to the pulse signal if the transmitted pulse signal was received within an active reception timeslot of the co-operative transceiver; and
a detector configured to detect the reflection signal and using timing information of a time of activation of an active transmission timeslot during which the pulse signal has been transmitted to establish active transmission timeslots of the transmitter for future communication.

20. The apparatus according to claim 19 further comprising a super-regenerative oscillator to generate a detection signal in response to the reflection signal.

21. The apparatus according to claim 19, wherein the detector is configured to detect that the amplitude of the reflection signal has exceeded a pre-determined threshold.

22. The apparatus according to claim 19 wherein the transceiver includes an RFID reader or an RFID tag.

23. A nontransitory computer readable medium comprising program instructions for carrying out the method of claim 1, wherein the program instructions are run on a processor based device, a terminal device, a network device, a portable terminal, a consumer electronic device or a wireless communication enable terminal.

24. A chipset configured to execute the method of claim 1.

25. The method according to claim 1 wherein the communication between transceivers utilizes timeslots within a symbol period and ultra wideband (UWB) signals having a series of pulses which are used to convey data information during a timeslot.

26. The apparatus according to claim 14 wherein the communication between transceivers utilizes timeslots within a symbol period and ultra wideband (UWB) signals having a series of pulses which are used to convey data information during a timeslot.

27. The apparatus according to claim 19 wherein the communication between transceivers utilizes timeslots within a symbol period and ultra wideband (UWB) signals having a series of pukes which are used to convey data information during a timeslot.

* * * * *